US012638592B2

(12) United States Patent
Bergam et al.

(10) Patent No.: US 12,638,592 B2
(45) Date of Patent: May 26, 2026

(54) LiDAR SYSTEM INCLUDING OBJECT MOVEMENT DETECTION

(71) Applicant: AUMOVIO Autonomous Mobility US, LLC, Auburn Hills, MI (US)

(72) Inventors: Jacob A Bergam, Santa Barbara, CA (US); Elliot John Smith, Ventura, CA (US)

(73) Assignee: AUMOVIO Autonomous Mobility US, LLC, Auburn Hills, MI (US)

( * ) Notice: Subject to any disclaimer, the term of this patent is extended or adjusted under 35 U.S.C. 154(b) by 1102 days.

(21) Appl. No.: 17/453,707

(22) Filed: Nov. 5, 2021

(65) Prior Publication Data

US 2023/0144787 A1      May 11, 2023

(51) Int. Cl.
| | |
|---|---|
| *G01S 17/931* | (2020.01) |
| *B60W 40/04* | (2006.01) |
| *G01S 3/785* | (2006.01) |
| *G01S 7/48* | (2006.01) |
| *G01S 17/58* | (2006.01) |
| *G01S 17/894* | (2020.01) |

(52) U.S. Cl.
CPC ........... *G01S 17/931* (2020.01); *B60W 40/04* (2013.01); *G01S 3/785* (2013.01); *G01S 7/4808* (2013.01); *G01S 17/58* (2013.01); *G01S 17/894* (2020.01); *B60W 2420/408* (2024.01)

(58) Field of Classification Search
CPC ...... G01S 17/931; G01S 3/785; G01S 7/4808; G01S 17/58; G01S 17/894; G01S 7/4865; G01S 17/10; G01S 17/42; G01S 7/4817; B60W 40/04; B60W 2420/408
See application file for complete search history.

(56) References Cited

U.S. PATENT DOCUMENTS

| | | |
|---|---|---|
| 4,862,257 A | 8/1989 | Ulich |
| 4,989,969 A | 2/1991 | Siebert et al. |
| 5,164,823 A | 11/1992 | Keeler |
| 5,270,780 A | 12/1993 | Moran et al. |
| 5,510,613 A | 4/1996 | Reilly et al. |
| 8,804,101 B2 | 8/2014 | Spagnolia et al. |
| 9,069,080 B2 | 6/2015 | Stettner et al. |
| 9,110,169 B2 | 8/2015 | Stettner et al. |
| 9,277,204 B2 | 3/2016 | Gilliland et al. |
| 9,420,246 B2 | 8/2016 | Na et al. |

(Continued)

FOREIGN PATENT DOCUMENTS

WO      WO-2021005609 A1 *   1/2021   ............... G06T 7/20

OTHER PUBLICATIONS

International Search Report and Written Opinion dated Feb. 24, 2023 from corresponding International patent application No. PCT/US2022/079358.

*Primary Examiner* — Vu Le
*Assistant Examiner* — Rachel Anne Ometz

(57) ABSTRACT

A LiDAR system includes alight emitter, a light detector, and a controller. The controller is programmed to: activate the light emitter to emit a series of shots into a field of view of the light detector; activate the light detector to detect shots reflected from an object in the field of view; record the detected shots from a first subset of the series of shots; group a second subset of the series of shots not in the first subset; and based on the detected shots from the second subset of the series of shots, identify an object moving in the field of view.

23 Claims, 17 Drawing Sheets

(56) References Cited

U.S. PATENT DOCUMENTS

| | | | |
|---|---|---|---|
| 9,797,995 | B2 | 10/2017 | Gilliland et al. |
| 9,834,209 | B2 | 12/2017 | Stettner et al. |
| 9,915,726 | B2 | 3/2018 | Bailey et al. |
| 10,126,411 | B2 | 11/2018 | Gilliland et al. |
| 10,241,196 | B2 | 3/2019 | Bailey et al. |
| 10,295,670 | B2 | 5/2019 | Stettner et al. |
| 10,377,373 | B2 | 8/2019 | Stettner et al. |
| 10,557,926 | B2 | 2/2020 | Gilliland et al. |
| 2018/0299552 | A1 | 10/2018 | Shu |
| 2018/0299556 | A1* | 10/2018 | Marcus ................. G01S 17/894 |
| 2019/0094342 | A1* | 3/2019 | Hiramatsu ............ G01S 17/894 |
| 2019/0154834 | A1* | 5/2019 | Heidrich ................. G01S 17/89 |
| 2019/0179320 | A1* | 6/2019 | Pacala .................... G01C 21/30 |
| 2019/0188505 | A1* | 6/2019 | Madkor ............... G08G 1/0141 |
| 2019/0257947 | A1* | 8/2019 | Zhang .................. G01S 17/931 |
| 2020/0088883 | A1* | 3/2020 | Lu ........................... G01S 17/10 |
| 2021/0096251 | A1* | 4/2021 | Nguyen ................ G01S 7/4868 |
| 2021/0109224 | A1* | 4/2021 | Finkelstein ........... G06F 3/0673 |
| 2022/0334253 | A1* | 10/2022 | Al Abbas ................ G01S 17/18 |

* cited by examiner

| Bin# | Distance(m) from Camera | Time(ms) allowed for no smear | Laser Shots allowed | Required bits Dynamic Flash |
|---|---|---|---|---|
| 0 | 0.10 | 0.011 | 3 | 2 |
| 36 | 9.93 | 1.131 | 283 | 17 |
| 73 | 20.13 | 2.293 | 573 | 24 |
| 109 | 30.06 | 3.423 | 856 | 30 |
| 145 | 39.99 | 4.554 | 1138 | 34 |
| 182 | 50.19 | 5.716 | 1429 | 38 |
| 218 | 60.12 | 6.847 | 1712 | 42 |
| 255 | 70.32 | 8.009 | 2002 | 45 |

*FIG. 10*

| Bin# | Distance(m) from Camera | Time(ms) allowed for no smear | Laser Shots allowed | Required bits Dynamic Flash | Sub-frames | Zone | Bins in Zone |
|---|---|---|---|---|---|---|---|
| 0 | 0.10 | 0.01 | 3 | 2 | 22.5 | 15 subframes | 2 |
| 1 | 0.28 | 0.03 | 8 | 3 | 15.0 | | |
| 2 | 0.55 | 0.06 | 16 | 4 | 11.3 | 9 subframes | 2 |
| 3 | 0.83 | 0.09 | 24 | 5 | 9.0 | | |
| 4 | 1.10 | 0.13 | 31 | 6 | 7.5 | 6 subframes | 3 |
| 6 | 1.65 | 0.19 | 47 | 7 | 6.4 | | |
| 7 | 1.93 | 0.22 | 55 | 8 | 5.6 | 4 subframes | 9 |
| 15 | 4.14 | 0.47 | 118 | 11 | 4.1 | | |
| 16 | 4.41 | 0.50 | 126 | 12 | 3.8 | 3 subframes | 13 |
| 28 | 7.72 | 0.88 | 220 | 15 | 3.0 | | |
| 29 | 8.00 | 0.91 | 228 | 16 | 2.8 | 2 subframes | 22 |
| 61 | 16.82 | 1.92 | 479 | 22 | 2.0 | | |
| 62 | 17.10 | 1.95 | 487 | 23 | 2.0 | N/A | 194 |
| 255 | 70.32 | 8.01 | 2002 | 45 | 1.0 | | |

*FIG. 13*

| Distance(m) from Camera | Zone | Zone | Bins in Zone |
|---|---|---|---|
| 0.10 | 15 subframes | 1 | 2 |
| 0.28 | | | |
| 0.55 | 9 subframes | 2 | 2 |
| 0.83 | | | |
| 1.10 | 6 subframes | 3 | 3 |
| 1.65 | | | |
| 1.93 | 4 subframes | 4 | 9 |
| 4.14 | | | |
| 4.41 | 3 subframes | 5 | 13 |
| 7.72 | | | |
| 8.00 | 2 subframes | 6 | 22 |
| 16.82 | | | |
| 17.10 | N/A | | 194 |
| 70.32 | | | |

Hit Matrix
Bin 2 (Zone 2) - r = 0.55m

|  | A | B | C | D | E |
|---|---|---|---|---|---|
| Subframe 1 | 0 | 0 | 0 | 0 | 1 |
| Subframe 2 | 0 | 0 | 0 | 0 | 1 |
| Subframe 3 | 0 | 0 | 0 | 1 | 0 |
| Subframe 4 | 0 | 0 | 0 | 1 | 0 |
| Subframe 5 | 0 | 0 | 0 | 1 | 0 |
| Subframe 6 | 0 | 0 | 1 | 0 | 0 |
| Subframe 7 | 0 | 0 | 1 | 0 | 0 |
| Subframe 8 | 0 | 0 | 0 | 0 | 0 |
| Subframe 9 | 0 | 0 | 0 | 0 | 0 |

Bin 3 (Zone 2) - r = 0.83m

|  | A | B | C | D | E |
|---|---|---|---|---|---|
| Subframe 1 | 0 | 0 | 0 | 0 | 0 |
| Subframe 2 | 0 | 0 | 0 | 0 | 0 |
| Subframe 3 | 0 | 0 | 0 | 0 | 0 |
| Subframe 4 | 0 | 0 | 0 | 0 | 0 |
| Subframe 5 | 0 | 0 | 0 | 0 | 0 |
| Subframe 6 | 0 | 0 | 0 | 0 | 0 |
| Subframe 7 | 0 | 0 | 0 | 0 | 0 |
| Subframe 8 | 0 | 0 | 1 | 0 | 0 |
| Subframe 9 | 0 | 1 | 0 | 0 | 0 |

*FIG. 15B*

LiDAR SYSTEM INCLUDING OBJECT MOVEMENT DETECTION

BACKGROUND

A solid-state LiDAR (Light Detection And Ranging) system includes a photodetector, or an array of photodetectors, that is fixed in place relative to a carrier, e.g., a vehicle. Light is emitted into the field of view of the photodetector and the photodetector detects light that is reflected by an object in the field of view, conceptually modeled as a packet of photons. For example, a Flash LiDAR system emits pulses of light, e.g., laser light, into the entire field of view. The detection of reflected light is used to generate a three-dimensional (3D) environmental map of the surrounding environment. The time of flight of reflected photons detected by the photodetector is used to determine the distance of the object that reflected the light.

The solid-state LiDAR system may be mounted on a vehicle to detect objects in the environment surrounding the vehicle and to detect distances of those objects for environmental mapping. The output of the solid-state LiDAR system may be used, for example, to autonomously or semi-autonomously control operation of the vehicle, e.g., propulsion, braking, steering, etc. Specifically, the system may be a component of or in communication with an advanced driver-assistance system (ADAS) of the vehicle.

A 3D map is generated through a histogram of time of flight of reflected photons. Difficulties can arise in providing sufficient memory for calculating and storing histograms of the time of flights.

BRIEF DESCRIPTION OF THE DRAWINGS

FIG. 10 is an example chart showing examples of the size of a subset of the series of shots recorded to memory for given distances of the object from the light detector.

FIG. 13 is an example chart showing examples of subframe numbers for different distance zones.

FIGS. 15A and 15B are a table and corresponding chart showing detection of object movement in the field of view.

DETAILED DESCRIPTION

Figure 1:
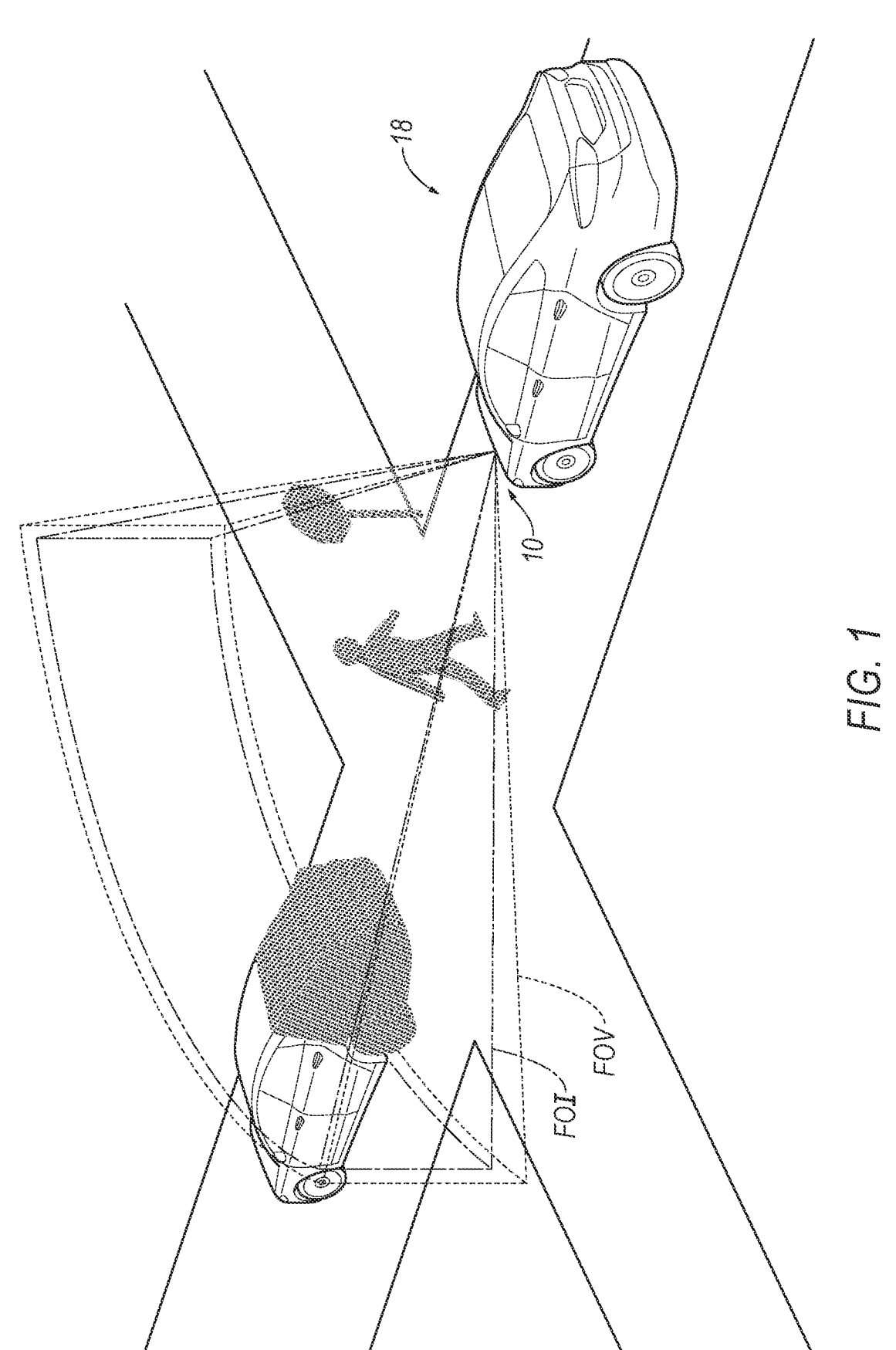
FIG. 1 is a perspective view of a vehicle including a LiDAR assembly.
Figure 2:
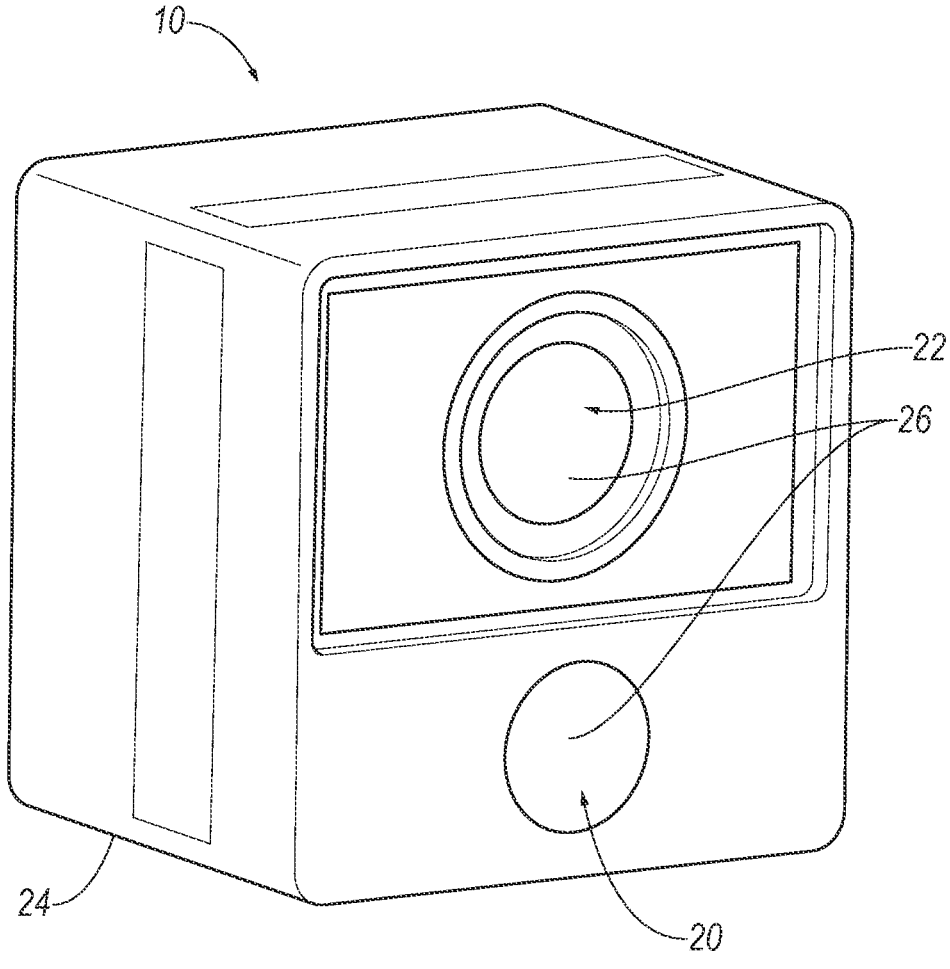
FIG. 2 is a perspective view of the LiDAR assembly.
Figure 3:
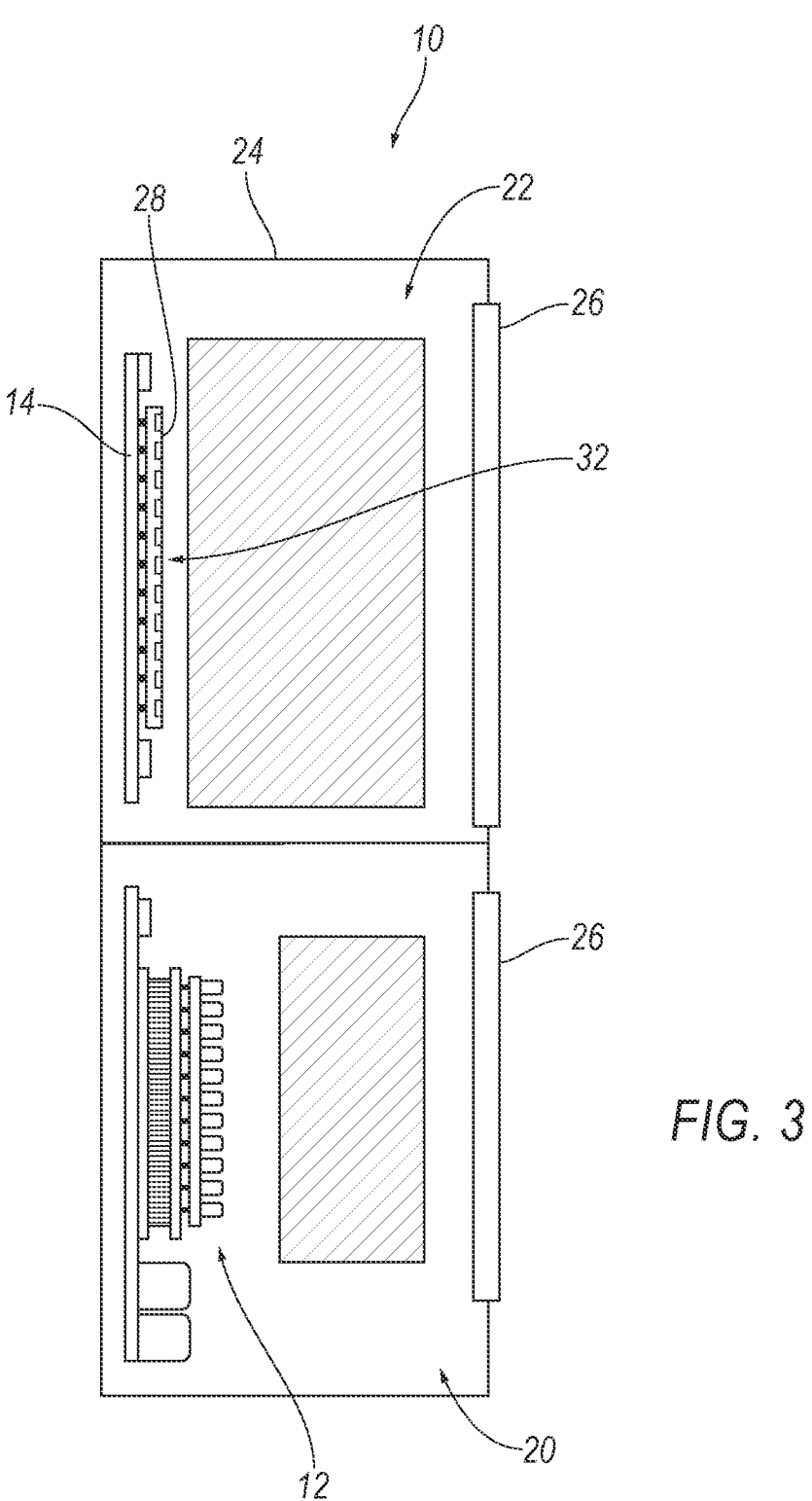
FIG. 3 is a schematic side view of the LiDAR assembly.
Figures 4, 4A:
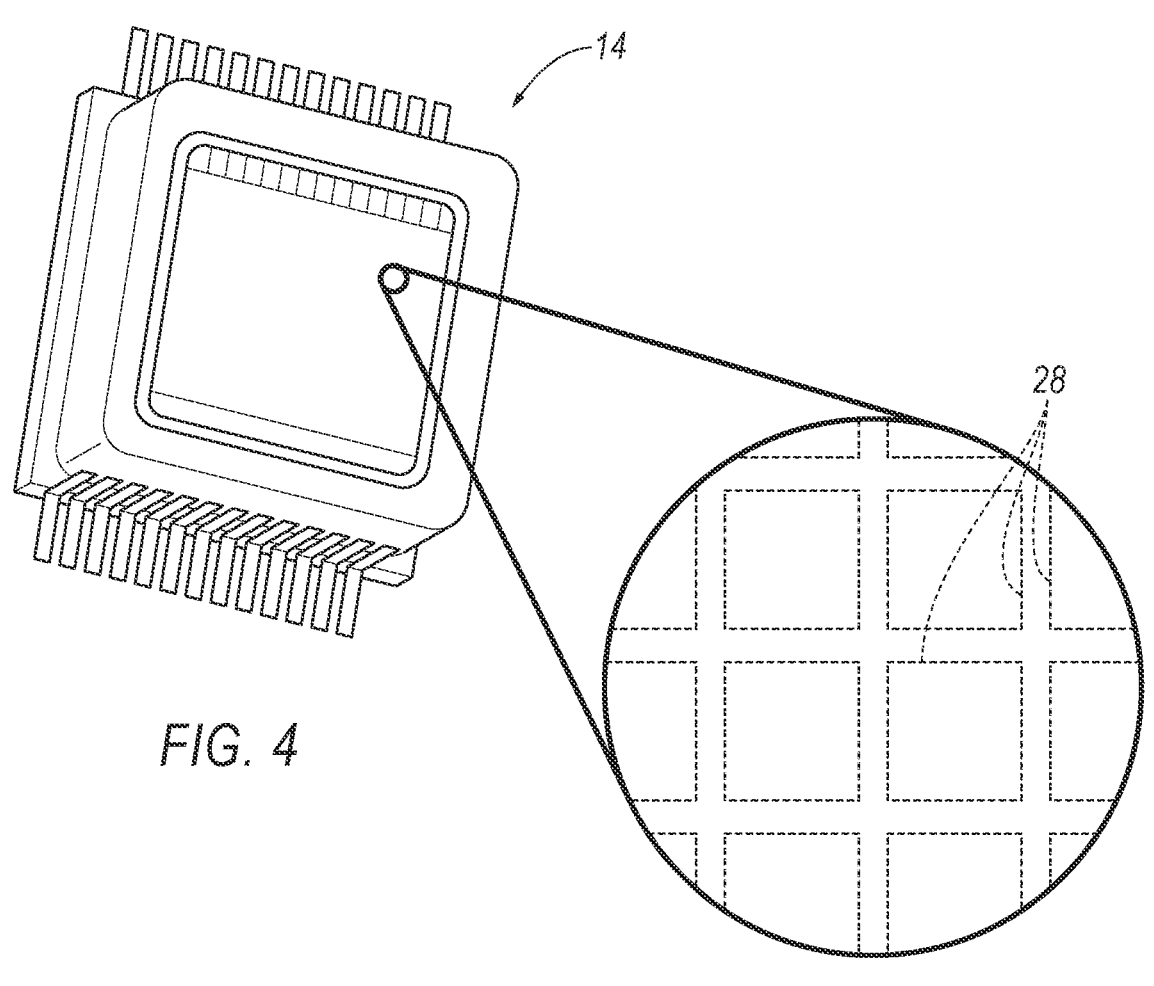
FIG. 4 is a perspective view of a light detector of the LiDAR assembly.
FIG. 4A is an magnified view of the light detector schematically showing an array of photodetectors.

With reference to the figures, wherein like numerals indicate like elements, a LiDAR system 10 is generally shown. The LiDAR system 10 includes a light emitter 12, a light detector 14, and a controller 16. The controller 16 is programmed to: activate the light emitter 12 to emit a series of shots into a field of view FOV of the light detector 14; activate the light detector 14 to detect shots reflected from an object in the field of view FOV; based on a distance of the object from the light detector 14, determine the size of a subset of the series of shots for which detected shots to be recorded; and record the detected shots of the subset of the series of shots.

The LiDAR system 10 uses detected shots from the first subset of the series of shots for environmental mapping, as described below, and uses detected shots from the second subset of the series of shots for identifying object movement in the field of view FOV. Specifically, the LiDAR system 10 uses the detected shots from the second subset of the series of shots to determine object velocity and acceleration and direction of object travel in one frame, i.e., during one series of shots emitted by the light emitter 12. As set forth further below, the total number of emitted shots for which detected shots are recorded is reduced to the first subset for use in environmental mapping in order to reduce memory usage. The detected shots that are not from shots in the first subset are not needed for environmental mapping. At least some of the shots not in the first subset are grouped in a second subset and detected shots from the second subset, i.e., detected shots not needed for environmental mapping, are used to determine object velocity, acceleration, and direction. Advantageously, the object velocity, acceleration, and direction are determined in one frame, i.e., based on one series of shots emitted from the light emitter 12.

As one example, the light detector 14 includes a plurality of pixels 30 and the controller 16 is programmed to compile a plurality of subframes based on object distance and pixel location of detected shots from the second subset of the series of shots. Each subframe is a compilation of detected shots across all pixels 30. Specifically, each subframe is based on a detected shots from a group of shots in the second subset of the series of shots emitted from the light emitter 12. Movement of an object, including velocity, acceleration, and direction, may be identified by comparing changes in object distance (i.e., from the light detector 14) and/or pixel location (i.e., which pixel(s) 30 detects the object) between subframes. As described further below, subframes may be similarly compiled from the detected shots of the first subset of the series of shots detected shots and combined for environmental mapping.

The LiDAR system 10 is shown in FIG. 1 as being mounted on a vehicle 18. In such an example, the LiDAR system 10 is operated to detect objects in the environment surrounding the vehicle 18 and to detect distance, i.e., range, of those objects for environmental mapping. The output of the LiDAR system 10 may be used, for example, to autonomously or semi-autonomously control operation of the vehicle 18, e.g., propulsion, braking, steering, etc. Specifically, the LiDAR system 10 may be a component of or in communication with an advanced driver-assistance system (ADAS) of the vehicle 18. The LiDAR system 10 may be mounted on the vehicle 18 in any suitable position and aimed in any suitable direction. As one example, the LiDAR system 10 is shown on the front of the vehicle 18 and directed forward. The vehicle 18 may have more than one LiDAR system 10 and/or the vehicle 18 may include other object detection systems, including other LiDAR systems. The vehicle 18 shown in the figures is a passenger automobile. As other examples, the vehicle 18 may be of any suitable manned or un-manned type including a plane, satellite, drone, watercraft, etc.

The LiDAR system 10 may be a solid-state LiDAR. In such an example, the LiDAR system 10 is stationary relative to the vehicle 18 in contrast to a mechanical LiDAR, also called a rotating LiDAR, that rotates 360 degrees. The solid-state LiDAR system 10, for example, may include a casing 24 that is fixed relative to the vehicle 18, i.e., does not move relative to the component of the vehicle 18 to which the casing 24 is attached, and components of the LiDAR system 10 are supported in the casing 24. As a solid-state LiDAR, the LiDAR system 10 may be a flash LiDAR system. In such an example, the LiDAR system 10 emits pulses, i.e., flashes, of light into the field of illumination FOI. More specifically, the LiDAR system 10 may be a 3D flash LiDAR system 10 that generates a 3D environmental map of the surrounding environment. In a flash LiDAR system 10, the FOI illuminates a field of view FOV that includes more than one photodetector 28, e.g., a 2D array, even if the illuminated 2D array is not the entire 2D array of the light detector 14. Another example of solid-state LiDAR includes an optical-phase array (OPA). Another example of solid-state LiDAR is a micro-electromechanical system (MEMS) scanning LiDAR, which may also be referred to as a quasi-solid-state LiDAR.

The LiDAR system 10 emits light and detects the emitted light that is reflected by an object, e.g., pedestrians, street signs, vehicles, etc. Specifically, the LiDAR system 10 includes a light-emission system 20, a light-receiving system 22, and the controller 16 that controls the light-emission system 20 and the light-receiving system 22.

The LiDAR system 10 may be a unit. Specifically, the LiDAR system 10 may include a casing 24 that supports the light-emission system 20 and the light-receiving system 22. The casing 24 may enclose the light-emission system 20 and the light-receiving system 22. The casing 24 may include mechanical attachment features to attach the casing 24 to the vehicle 18 and electronic connections to connect to and communicate with electronic system of the vehicle 18, e.g., components of the ADAS. The window 26 extends through the casing 24. The window 26 includes an aperture extending through the casing 24 and may include a lens or other optical device in the aperture. The casing 24, for example, may be plastic or metal and may protect the other components of the LiDAR system 10 from moisture, environmental precipitation, dust, etc. In the alternative to the LiDAR system 10 being a unit, components of the LiDAR system 10, e.g., the light-emission system 20 and the light-receiving system 22, may be separated and disposed at different locations of the vehicle 18.

The light-emission system 20 may include one or more light emitter 12 and optical components such as a lens package, lens crystal, pump delivery optics, etc. The optical components, e.g., lens package, lens crystal, etc., may be between the light emitter 12 on a back end of the casing 24 and a window 26 on a front end of the casing 24. Thus, light emitted from the light emitter 12 passes through the optical components before exiting the casing 24 through the window 26. The optical components may include an optical element, a collimating lens, a beam-steering device, transmission optics, etc. The optical components direct the light, e.g., in the casing 24 from the light emitter 12 to the window 26, and shapes the light, etc.

The light emitter 12 emits light for illuminating objects for detection. The light-emission system 20 may include a beam-steering device and/or transmission optics, i.e., focusing optics, between the light emitter 12 and the window 26. The controller 16 is in communication with the light emitter 12 for controlling the emission of light from the light emitter 12 and, in examples including a beam-steering device, the controller 16 is in communication with the beam-steering device for aiming the emission of light from the LiDAR system 10. The transmission optics shape the light from the light emitter 12 and guide the light through the window 26 to a field of illumination FOI.

The light emitter 12 emits light into the field of illumination FOI for detection by the light-receiving system 22 when the light is reflected by an object in the field of view FOV. The light emitter 12 emits shots, i.e., pulses, of light into the field of illumination FOI for detection by the light-receiving system 22 when the light is reflected by an object in the field of view FOV to return photons to the light-receiving system 22. Specifically, the light emitter 12 emits a series of shots. As an example, the series of shots may be 1,500-2,500 shots. The light-receiving system 22 has a field of view FOV that overlaps the field of illumination FOI and receives light reflected by surfaces of objects, buildings, road, etc., in the FOV. In other words, the light-receiving system 22 detects shots emitted from the light emitter 12 and reflected in the field of view FOV back to the light-receiving system 22, i.e., detected shots. The light emitter 12 may be in electrical communication with the controller 16, e.g., to provide the shots in response to commands from the controller 16.

The light emitter 12 may be, for example, a laser. The light emitter 12 may be, for example, a semiconductor light emitter, e.g., laser diodes. In one example, the light emitter 12 is a vertical-cavity surface-emitting laser (VCSEL). As another example, the light emitter 12 may be a diode-pumped solid-state laser (DPSSL). As another example, the light emitter 12 may be an edge emitting laser diode. The light emitter 12 may be designed to emit a pulsed flash of light, e.g., a pulsed laser light. Specifically, the light emitter 12, e.g., the VCSEL or DPSSL or edge emitter, is designed to emit a pulsed laser light or train of laser light pulses. The light emitted by the light emitter 12 may be, for example, infrared light. Alternatively, the light emitted by the light emitter 12 may be of any suitable wavelength. The LiDAR system 10 may include any suitable number of light emitters, i.e., one or more in the casing 24. In examples that include more than one light emitter 12, the light emitters may be identical or different. As set forth above, the light emitter 12 is aimed at the optical element. Specifically, the light emitter 12 is aimed at a light-shaping surface of the optical element. The light emitter 12 may be aimed directly at the optical element or may be aimed indirectly at the optical element through intermediate components such as reflectors/deflectors, diffusers, optics, etc. The light emitter 12 is aimed at the beam-steering device either directly or indirectly through intermediate components.

The light emitter 12 may be stationary relative to the casing 24. In other words, the light emitter 12 does not move relative to the casing 24 during operation of the LiDAR system 10, e.g., during light emission. The light emitter 12 may be mounted to the casing 24 in any suitable fashion such that the light emitter 12 and the casing 24 move together as a unit.

The light-receiving system 22 has a field of view FOV that overlaps the field of illumination FOI and receives light reflected by objects in the FOV. The light-receiving system 22 may include receiving optics and a light detector 14 having the array of photodetectors 28. The light-receiving system 22 may include a receiving window 26 and the receiving optics may be between the receiving window 26 and the array of photodetectors 28. The receiving optics may be of any suitable type and size.

As set forth above, the light-receiving system 22 includes the light detector 14 including the array of photodetectors 28, i.e., a photodetector array. The light detector 14 includes a chip and the array of photodetectors 28 is on the chip, as described further below. The chip may be silicon (Si), indium gallium arsenide (InGaAs), germanium (Ge), etc., as is known. The chip and the photodetectors 28 are shown schematically. The array of photodetectors 28 is 2-dimensional. Specifically, the array of photodetectors 28 includes a plurality of photodetectors 28 arranged in a columns and rows.

Each photodetector 28 is light sensitive. Specifically, each photodetector 28 detects photons by photo-excitation of electric carriers. An output signal from the photodetector 28 indicates detection of light and may be proportional to the amount of detected light. The output signals of each photodetector 28 are collected to generate a scene detected by the photodetector 28. The photodetectors 28 may be of any suitable type, e.g., photodiodes (i.e., a semiconductor device having a p-n junction or a p-i-n junction) including avalanche photodiodes (APD), metal-semiconductor-metal photodetectors, phototransistors, photoconductive detectors, phototubes, photomultipliers, etc. As an example, the photodetector 28 may be a single-photon avalanche diode (SPAD), as described below. As other examples, the photodetectors 28 may each be a silicon photomultiplier (SiPM), a PIN diode, etc.

In examples in which the photodetectors 28 are SPADs, the SPAD is a semiconductor device having a p-n junction that is reverse biased (herein referred to as "bias") at a voltage that exceeds the breakdown voltage of the p-n junction, i.e., in Geiger mode. The bias voltage is at a magnitude such that a single photon injected into the depletion layer triggers a self-sustaining avalanche, which produces a readily-detectable avalanche current. The leading edge of the avalanche current indicates he arrival time of the detected photon. In other words, the SPAD is a triggering device of which usually the leading edge determines the trigger.

The SPAD operates in Geiger mode. "Geiger mode" means that the APD is operated above the breakdown voltage of the semiconductor and a single electron—hole pair (generated by absorption of one photon) can trigger a strong avalanche (commonly known as a SPAD). The SPAD is biased above its zero-frequency breakdown voltage to produce an average internal gain on the order of one million. Under such conditions, a readily-detectable avalanche current can be produced in response to a single input photon, thereby allowing the SPAD to be utilized to detect individual photons. "Avalanche breakdown" is a phenomenon that can occur in both insulating and semiconducting materials. It is a form of electric current multiplication that can allow very large currents within materials which are otherwise good insulators. It is a type of electron avalanche. In the present context, "gain" is a measure of an ability of a two-port circuit, e.g., the SPAD, to increase power or amplitude of a signal from the input to the output port.

When the SPAD is triggered in a Geiger-mode in response to a single input photon, the avalanche current continues as long as the bias voltage remains above the breakdown voltage of the SPAD. Thus, in order to detect the next photon, the avalanche current must be "quenched" and the SPAD must be reset. Quenching the avalanche current and resetting the SPAD involves a two-step process: (i) the bias voltage is reduced below the SPAD breakdown voltage to quench the avalanche current as rapidly as possible, and (ii) the SPAD bias is then raised by the power-supply circuit 34 to a voltage above the SPAD breakdown voltage so that the next photon can be detected.

The light detector 14 includes multiple pixels 30. Each pixel 30 can include one or more photodetectors 28. The pixel 30 includes one photodetector 28 in the example shown in FIG. 6. Each pixel 30 can output a count of incident photons, a time between incident photons, a time of incident photons (e.g., relative to an illumination output time), or other relevant data, and the LiDAR system 10 can transform these data into distances from the LiDAR system 10 to external surfaces in the fields of view of these pixels 30. By merging these distances with the position of pixels 30 at which these data originated and relative positions of these pixels 30 at a time that these data were collected, the LiDAR system 10 (or other device accessing these data) can reconstruct a three-dimensional (virtual or mathematical) model of a space occupied by the LiDAR system 10, such as in the form of 3D image represented by a rectangular matrix of range values, wherein each range value in the matrix corresponds to a polar coordinate in 3D space. Each photodetector 28 within a pixel 30 can be configured to detect a single photon per sampling period. A pixel 30 can thus include multiple photodetectors 28 in order to increase the dynamic range of the pixel 30; in particular, the dynamic range of the pixel 30 (and therefore of the LiDAR system 10) can increase as a number of detectors integrated into each pixel 30 increases, and the number of photodetectors 28 that can be integrated into a pixel 30 can scale linearly with the area of the pixel 30. For example, a pixel 30 can include an array of SPADs. For photodetectors 28 ten to fifty microns in diameter, the pixel 30 can define a footprint approximately 400 microns square. However, the light detector 14 can include any other type of pixel 30 including any other number of photodetectors 28. The pixel 30 functions to output a single signal or stream of signals corresponding to a count of photons incident on the pixel 30 within one or more sampling periods. Each sampling period may be picoseconds, nanoseconds, microseconds, or milliseconds in duration. The pixel 30 can output a count of incident photons, a time between incident photons, a time of incident photons (e.g., relative to an illumination output time), or other relevant data, and the LiDAR system 10 can transform these data into distances from the LiDAR system 10 to external surfaces in the fields of view of these pixels 30. By merging these distances with the position of pixels 30 at which these data originated and relative positions of these pixels 30 at a time that these data were collected, the controller 16 (or other device accessing these data) can reconstruct a three-dimensional 3D (virtual or mathematical) model of a space within FOV, such as in the form of 3D image represented by a rectangular matrix of range values, wherein each range value in the matrix corresponds to a polar coordinate in 3D space. The pixels 30 may be arranged as an array, e.g., a 2-dimensional (2D) or a 1-dimensional (1D) arrangement of components. A 2D array of pixels 30 includes a plurality of pixels 30 arranged in columns and rows.

The light detector 14 may be a focal-plane array (FPA) 32. The FPA 32 includes pixels 30 each including a power-supply circuit 34 and a read-out integrated circuit (ROIC) 36. The pixel 30 may include any number of photodetectors 28 connected the power-supply circuit 34 of the pixel 30 and to the ROIC 36 of the pixel 30. In one example, the pixel 30 includes one photodetector 28 connected to the power-supply circuit 34 of the pixel 30 and connected to the ROIC 36 of the pixel 30 (e.g., via wire bonds, silicon vias TSV, etc.). The FPA 32 may include a 1D or 2D array of pixels 30. Thus, in this example FPA 32, each photodetector 28 is individually powered by the power-supply circuit 34 which may prevent cross-talk and/or reduction of bias voltage in some areas, e.g., a central area of the layer, of the FPA 32 compared to, e.g., the perimeter of the layer. "Individually powered" means a power-supply circuit 34 is electrically connected to each photodetector 28. Thus, applying power to each of the photodetectors 28 may be controlled individually. Another example pixel 30 includes two photodetectors 28, i.e., a first and a second photodetector 28, connected to the power-supply circuit 34 of the pixel 30 and connected to the ROIC 36 of the pixel 30. A wire bond electrically connects the components of layers. Thus, the first and second photodetectors 28 of the pixel 30 may be controlled together. In other words, the power-supply circuit 34 may supply power to the first and second photodetectors 28, e.g., based on a common cathode wiring technique. Additionally or alternatively, the photodetectors 28 may be individually wired (not shown). For example, in the example described above, a first wire bond may electrically connect the power-supply circuit 34 to the first photodetector 28 and a second wire bond may electrically connect the power-supply circuit 34 to the second photodetector 28.

The FPA 32 detects photons by photo-excitation of electric carriers. An output from the FPA 32 indicates a detection of light and may be proportional to the amount of detected light, in the case of a PiN diode or APD, and may be a digital signal in case of a SPAD. The outputs of FPA 32 are collected to generate a 3D environmental map, e.g., 3D location coordinates of objects and surfaces within the field of view FOV of the LiDAR system 10. The FPA 32 may include a semiconductor component for detecting laser and/or infrared reflections from the field of view FOV of the LiDAR system 10, e.g., photodiodes (i.e., a semiconductor device having a p-n junction or a p-i-n junction) including avalanche photodiodes, SPADs, metal-semiconductor-metal photodetectors 28, phototransistors, photoconductive detectors, phototubes, photomultipliers, etc. The optical elements such as the lens package of the light-receiving system 22 may be positioned between the FPA 32 in the back end of the casing 24 and the window 26 on the front end of the casing 24.

The ROIC 36 converts an electrical signal received from photodetectors 28 of the FPA 32 to digital signals. The ROIC 36 may include electrical components which can convert electrical voltage to digital data. The ROIC 36 may be connected to the controller 16, which receives the data from the ROIC 36 and may generate 3D environmental map based on the data received from the ROIC 36.

In the example shown in the figures, merely by way of example, the FPA 32 includes three layers, as described below. In other words, the example shown in the figures is a triple-die stack. As other examples, the FPA may have two layers, i.e., a two-die stack. In such an example, one layer includes the photodetector 28 and the power-supply circuit 34 and the other layer includes the ROIC 36. In another example, all components of the FPA 32 may be on a single silicon chip.

Figure 5:
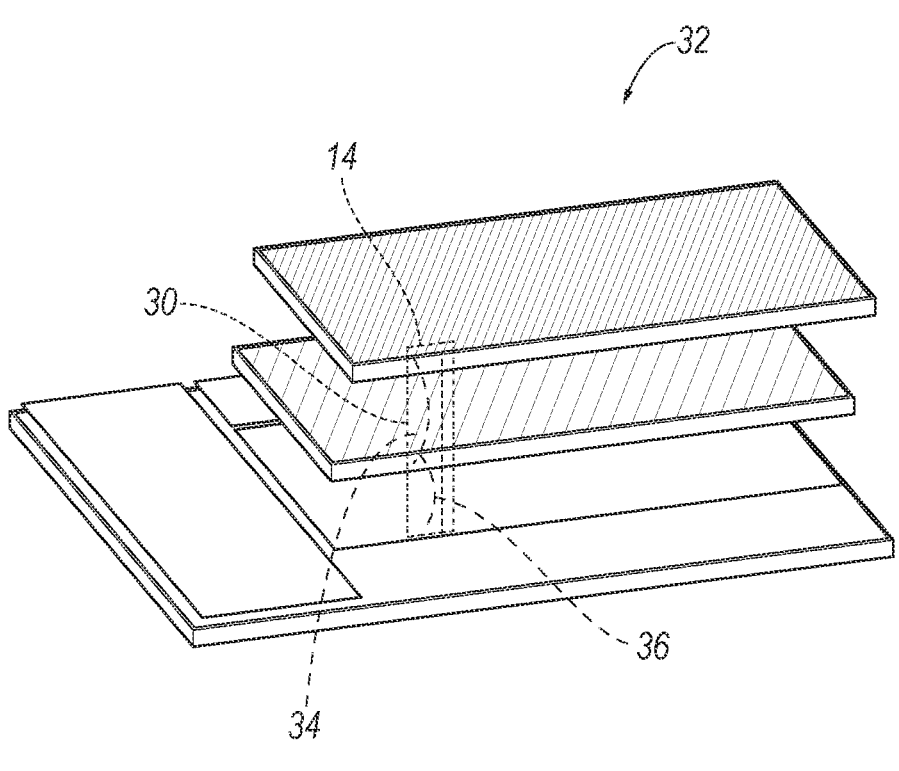
FIG. 5 is a schematic view of a focal-plane array (FPA) of the light receiver with layers illustrated in an exploded position.
Figure 6:
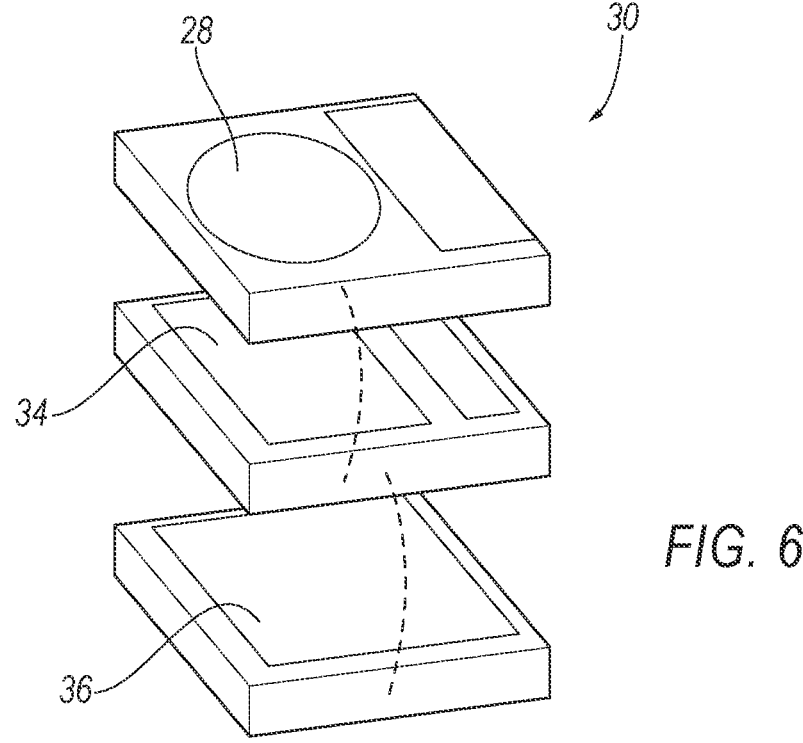
FIG. 6 is a schematic view of an example pixel of the FPA.
Figure 7:
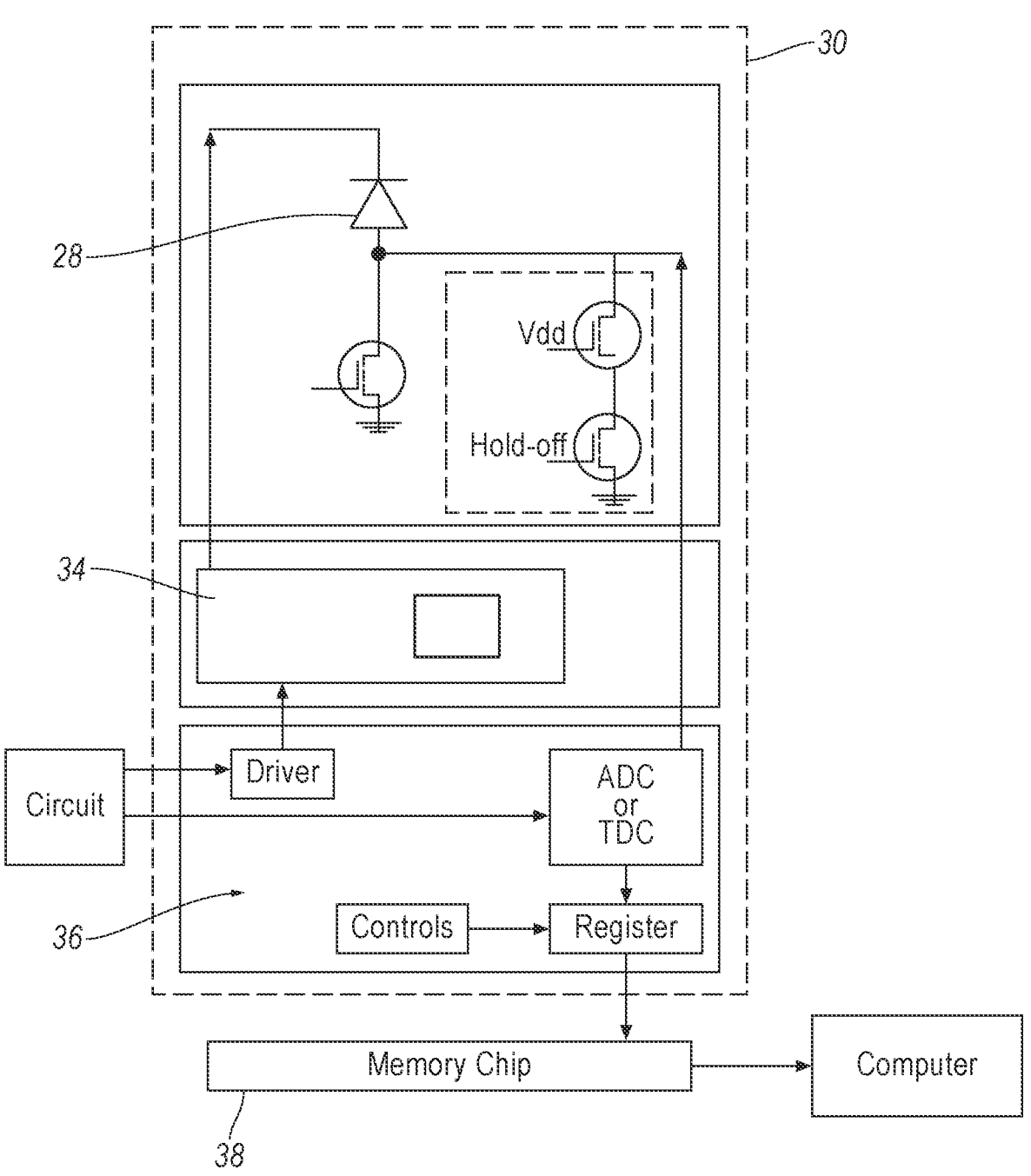
FIG. 7 is a schematic view of an example electrical circuit of the pixel.
Figure 8:
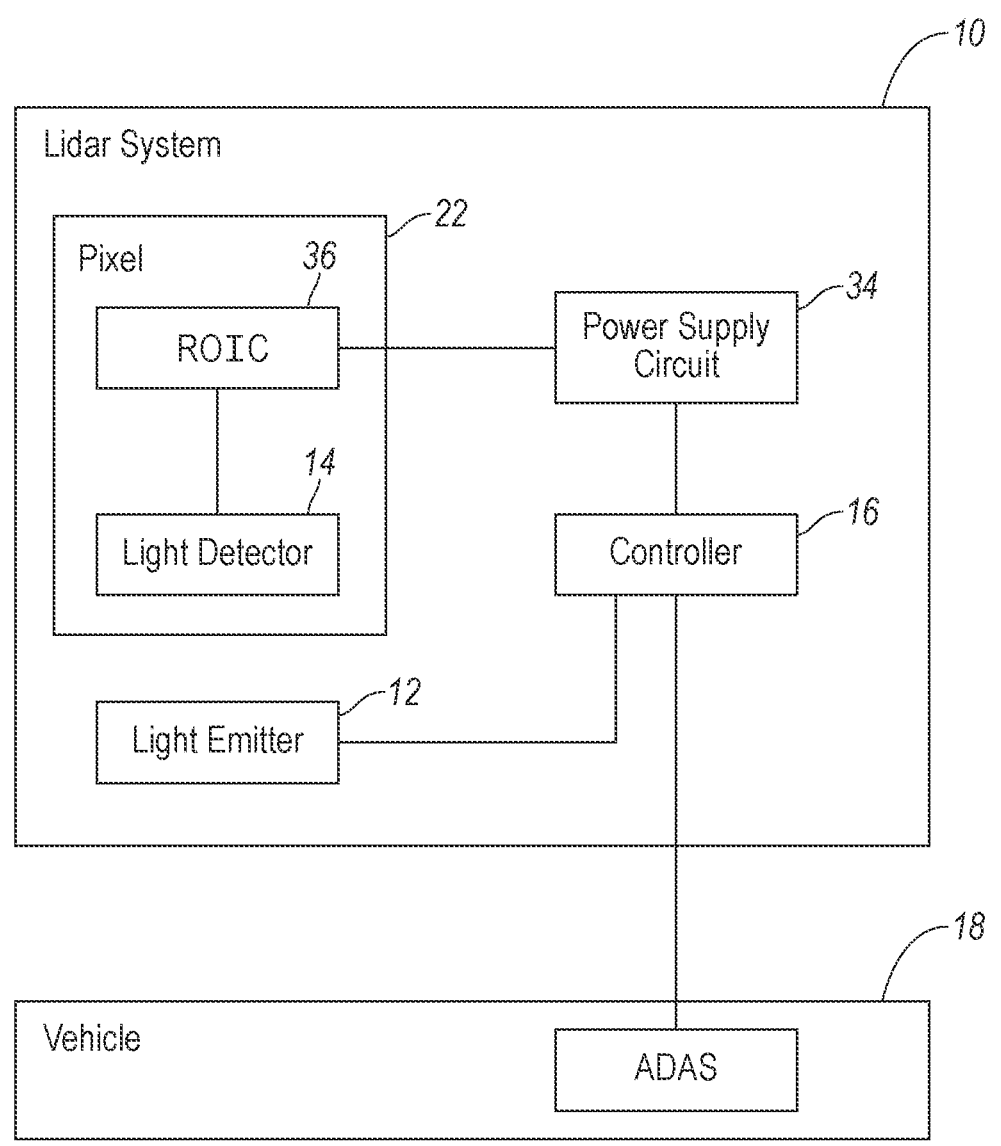
FIG. 8 is a block diagram of the LiDAR system.
Figure 9A:
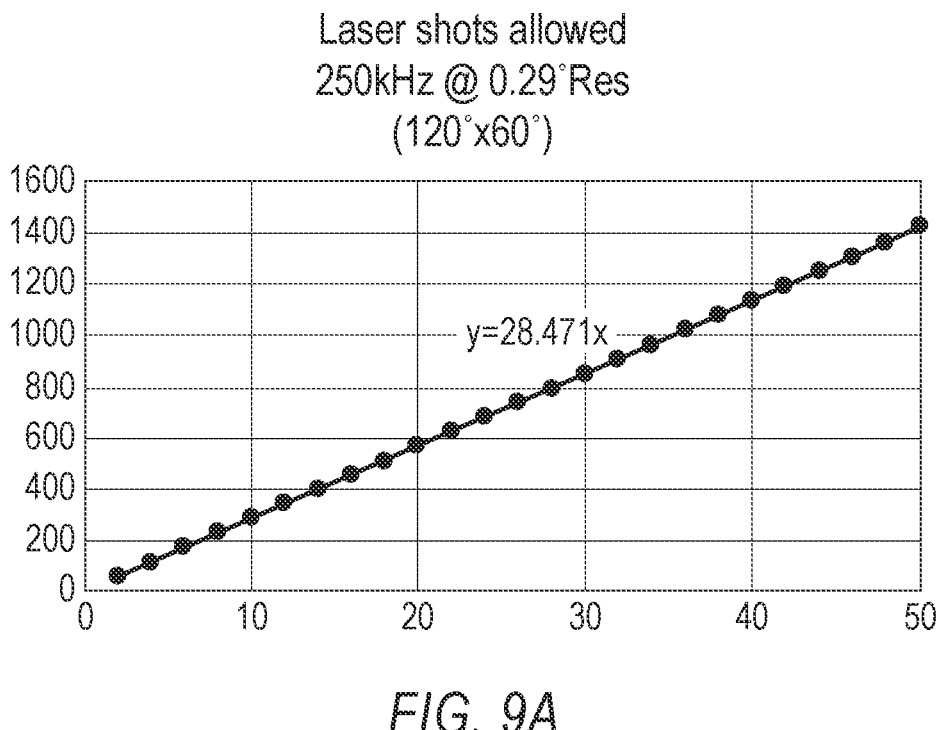
FIGS. 9A and 9B are two examples of the size of a subset of the series of shots recorded to memory for given distances of the object from the light detector.
Figure 9B:
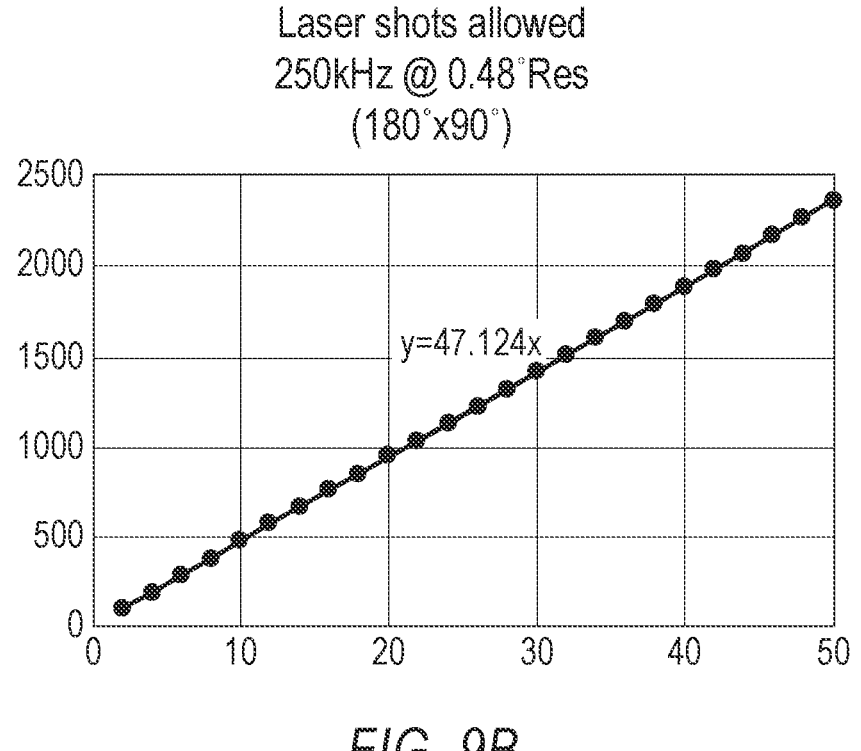

Merely as an example, in the example shown in FIGS. 5-7, the light-receiving system 22 may include a first layer in which each pixel 30 includes at least one photodetector 28 on the first layer, a second layer with the ROIC 36 on the second layer, and a middle layer with the power-supply circuit 34 on the middle layer stacked between the first layer and the second layer. In such an example, the first layer is a focal-plane array layer, the middle layer is a power-control layer, and the second layer is a ROIC 36 layer. Specifically, a plurality of photodetectors 28, e.g., SPADs, are on the first layer, a plurality of ROICs 36 are on the second layer, and a plurality of power-supply circuits 34 are on the middle layer. Each pixel 30 includes at least one of the photodetectors 28 connected to only one of the power-supply circuits 34, and each power-supply circuit 34 is connected to only one of the ROICs 36. Said differently, each power-supply circuit 34 is dedicated to one of the pixels 30 and each ROIC 36 is dedicated to one of the pixels 30. Each pixel 30 may include more than photodetector 28. The first layer abuts, i.e., directly contacts, the middle layer and the second layer abuts the middle layer. Specifically, the middle layer is directly bonded to the first layer and the second layer. The middle layer is between the first layer and the second layer. In use, the FPA 32 is in the stacked position.

A layer in the present context, is one or more pieces of die. If a layer includes multiple dies, then the dies are placed next to each other forming a plane (i.e., a flat surface). A die, in the present context, is a block of semiconducting material on which a given functional circuit is fabricated. Typically, integrated circuits (ICs) are produced in large batches on a single wafer of electronic-grade silicon (EGS) or other semiconductors (such as GaAs) through processes such as photolithography. A wafer is then cut (diced) into pieces, each containing one copy of the circuit. Each of these pieces is called a die. A wafer (also called a slice or substrate), in the present context, is a thin slice of semiconductor, such as a crystalline silicon (c-Si), used for fabrication of integrated circuits.

As set forth further below, the middle layer is bonded directly to the first layer and the second layer. In order to provided electrical connection between the electrical components of the layers, e.g., providing power supply from the power-supply circuit 34 on the middle layer to the photodetectors 28 on the first layer and providing read-out from the photodetectors 28 on the first layer to the ROICs 36 on the second layer, the layers are electrically connected, e.g., via wire bonds or through Silicon Vias (TSV). Specifically, in each pixel 30, the photodetector 28 is connected by wire bonds or TSVs to the power-supply circuit 34 and the ROIC 36 of the pixel 30. Wire bonding, wafer bonding, die bonding, etc., are electrical interconnect technology for making interconnections between two or more semiconductor devices and/or a semiconductor device and a packaging of the semiconductor device. Wire bonds may be formed of aluminum, copper, gold or silver and may typically have a diameter of at least 15 micrometers (μm). Note that wire bonds provide electrical connection between the layers in the stacked position.

The power-supply circuits 34 supply power to the photodetectors 28 of the first layer. The power-supply circuit 34 may include active electrical components such as MOSFET (Metal-Oxide-Semiconductor Field-Effect Transistor), BiCMOS (Bipolar CMOS), etc., and passive components such as resistors, capacitors, etc. As an example, the power-supply circuit 34 may supply power to the photodetectors 28 in a first voltage range, e.g., 10 to 30 Volt (V) Direct Current (DC), which is higher than a second operating voltage of the ROIC 36 of the second layer, e.g., 0.4 to 5V DC. The power-supply circuit 34 may receive timing information from the ROIC 36. Since the power-supply circuit 34 and the ROIC 36 are on separate layers (middle layer and the second layer), the low-voltage components for the ROIC 36 and the high-voltage components for the avalanche-type diode are separated, allowing for the top-down footprint of the pixel 30.

With reference to FIG. 7, the LiDAR system 10 includes a memory chip 38. Data output from the ROIC 36 may be stored in a memory chip 38 for processing by the controller 16. The memory chip 38 may be a DRAM (Dynamic Random Access Memory), an SRAM (Static Random Access Memory), and/or a MRAM (Magneto-resistive Random Access Memory) may be electrically connected to the ROIC. In one example, an FPA 32 may include the memory chip 38 on the second layer and electrically connected to the ROIC 36. In another example, the memory chip 38 may be attached to a bottom surface of the second layer (i.e., not facing the middle layer) and electrically connected, e.g., via wire bods, to the ROIC 36 of the second layer. Additionally or alternatively, the memory chip 38 can be a separate chip (i.e., not wire bonded to the second layer) and the FPA 32 can be stacked on and electrically connected to the memory chip 38, e.g., via TSV.

The FPA 32 may include a circuit that generates a reference clock signal for operating the photodetectors 28. Additionally, the circuit may include logic circuits for actuating the photodetectors 28, power-supply circuit 34, ROIC 36, etc.

As set forth above, the FPA 32 includes a power-supply circuit 34 that powers the pixels 30, e.g., to the SPADs. The FPA 32 may include a single power-supply circuit 34 in communication with all pixels 30 or may include a plurality of power-supply circuits 34 in communication with a group of the pixels 30.

The power-supply circuit 34 may include active electrical components such as MOSFET (Metal-Oxide-Semiconductor Field-Effect Transistor), BiCMOS (Bipolar CMOS), IGBT (Insulated-gate bipolar transistor), VMOS (vertical MOSFET), HexFET, DMOS (double-diffused MOSFET) LDMOS (lateral DMOS), BJT (Bipolar junction transistor), etc., and passive components such as resistors, capacitors, etc. The power-supply circuit 34 may include a power-supply control circuit. The power-supply control circuit may include electrical components such as a transistor, logical components, etc. The power-supply control circuit may control the power-supply circuit 34, e.g., in response to a command from the controller 16, to apply bias voltage and quench and reset the SPAD.

In examples in which the photodetector 28 is an avalanche-type diode, e.g., a SPAD, to control the power-supply circuit 34 to apply bias voltage, quench, and reset the avalanche-type diodes, the power-supply circuit 34 may include a power-supply control circuit. The power-supply control circuit may include electrical components such as a transistor, logical components, etc.

A bias voltage, produced by the power-supply circuit 34, is applied to the cathode of the avalanche-type diode. An output of the avalanche-type diode, e.g., a voltage at a node, is measured by the ROIC 36 circuit to determine whether a photon is detected.

The power-supply circuit 34 supplies the bias voltage to the avalanche-type diode based on inputs received from a driver circuit of the ROIC 36. The ROIC 36 on the second layer may include the driver circuit to actuate the power-supply circuit 34, an analog-to-digital (ADC) or time-to-digital (TDC) circuit to measure an output of the avalanche-type diode at the node, and/or other electrical components such as volatile memory (register), and logical control circuits, etc. The driver circuit may be controlled based on an input received from the circuit of the FPA 32, e.g., a reference clock. Data read by the ROIC 36 may be then stored in the memory chip 38. As discussed above, the memory chip 38 may be external to the FPA 32 or included in the FPA 32, e.g., the second layer may be stacked on top of the memory chip 38. A controller 16, e.g., the controller 16, a controller 16 of the LiDAR system 10, etc., may receive the data from the memory chip 38 and generate 3D environmental map, location coordinates of an object within the FOV of the LiDAR system 10, etc.

The controller 16 actuates the power-supply circuit 34 to apply a bias voltage to the plurality of avalanche-type diodes. For example, the controller 16 may be programmed to actuate the ROIC 36 to send commands via the ROIC 36 driver to the power-supply control circuit to apply a bias voltage to individually powered avalanche-type diodes. Specifically, the controller 16 supplies bias voltage to avalanche-type diodes of the plurality of pixels 30 of the focal-plane array through a plurality of the power-supply circuits 34, each power-supply circuit 34 dedicated to one of the pixels 30, as described above. The individual addressing of power to each pixel 30 can also be used to compensate manufacturing variations via look-up-table programmed at an end-of-line testing station. The look-up-table may also be updated through periodic maintenance of the LiDAR system 10.

The controller 16 receives data from the LiDAR system 10. The controller 16 may be programmed to receive data from the memory chip 38. The data in the memory chip 38 is an output of an ADC and/or TDC of the ROIC 36 including determination of whether any photon was received by any of the avalanche-type diodes. Specifically, the controller 16 reads out an electrical output of the at least one of the avalanche-type diodes through read-out circuits of the focal-plane array, each read-out circuit of the focal-plane array being dedicated to one of the pixels 30.

Infrared light emitted by the light emitter 12 may be reflected off an object back to the LiDAR system 10 and detected by the photodetectors 28. An optical signal strength of the returning infrared light may be, at least in part, proportional to a time of flight/distance between the LiDAR system 10 and the object reflecting the light. The optical signal strength may be, for example, an amount of photons that are reflected back to the LiDAR system 10 from one of the shots of pulsed light. The greater the distance to the object reflecting the light/the greater the flight time of the light, the lower the strength of the optical return signal, e.g., for shots of pulsed light emitted at a common intensity. The LiDAR system 10 generates a histogram for each pixel 30 based on detection of returned shots. The histogram may be used to generate the 3D environmental map. The controller 16 is programmed to compile a histogram (e.g., that may be used to generate the 3D environmental map) based on detected shots of the series, e.g., detected by the photodetectors 28 and received from the ROICs 36. The histogram indicates an amount and/or frequency at which light is detected from different reflection distances, i.e., having different times of flights.

Specifically, each pixel 30 includes multiple registers with each register representing a certain distance from the light detector 14. The controller 16 may flip through each register (i.e., multiple registers per pixel 30 in order to build up a histogram from all the registers (distances). Specifically, as described further below, the ROIC 36 reads from the registers to memory, e.g., to the memory chip 38. The memory chip 38 stores bits of memory dedicated to each register of the histogram. As described further below, since detected shots from a smaller subset of the series of shots is recorded for closer objects, memory associated with the closer objects may be reduced. Specifically, the bits of memory dedicated to bins of the histogram for closer objects are less than the bits of memory dedicated to bins of the histogram for farther objects. Accordingly, memory associated with bins for objects closer to the light detector 14 is smaller than memory associated with bins for objects farther from the light detector 14. The memory associated with the bins, respectively, progressively increases with increase in object distance from the light detector 14.

Based on the histogram data, the controller 16 compiles a plurality of subframes based on object distance and pixel location of detected shots from the first subset of detected shots. These subframes based on the first subset are combined, e.g., by the controller 16, to generate an environmental map.

The controller 16 is in electronic communication with the pixels 30 (e.g., with the ROIC and power-supply circuit) and the vehicle 18 (e.g., with the ADAS) to receive data and transmit commands. The controller 16 may be configured to execute operations disclosed herein.

The controller 16 may be a microprocessor-based controller 16 or field programmable gate array (FPGA), or a combination of both, implemented via circuits, chips, and/or other electronic components. In other words, the controller 16 is a physical, i.e., structural, component of the LiDAR system 10. The controller includes a processor, memory, etc. The memory of the controller may store instructions executable by the processor, i.e., processor-executable instructions, and/or may store data. The controller may be in communication with a communication network of the vehicle to send and/or receive instructions from the vehicle, e.g., components of the ADAS. The instructions stored on the memory of the controller include instructions to perform the method in the figures. Use herein (including with reference to the method 1200 in FIG. 12) of "based on," "in response to," and "upon determining," indicates a causal relationship, not merely a temporal relationship.

The controller 16 may include a processor and a memory. The memory includes one or more forms of controller-readable media, and stores instructions executable by the controller for performing various operations, including as disclosed herein. Additionally or alternatively, the controller 16 may include a dedicated electronic circuit including an ASIC (Application Specific Integrated Circuit) that is manufactured for a particular operation, e.g., calculating a histogram of data received from the LiDAR system 10 and/or generating a 3D environmental map for a Field of View FOV of the vehicle 18. In another example, the controller 16 may include an FPGA (Field Programmable Gate Array) which is an integrated circuit manufactured to be configurable by a customer. As an example, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, and logical components inside an FPGA may be configured based on VHDL programming, e.g. stored in a memory electrically connected to the FPGA circuit. In some examples, a combination of processor(s), ASIC(s), and/or FPGA circuits may be included inside a chip packaging. A controller 16 may be a set of controllers communicating with one another via the communication network of the vehicle 18, e.g., a controller 16 in the LiDAR system and a second controller 16 in another location in the vehicle 18.

The controller 16 may operate the vehicle 18 in an autonomous, a semi autonomous mode, or a non autonomous (or manual) mode. For purposes of this disclosure, an autonomous mode is defined as one in which each of vehicle propulsion, braking, and steering are controlled by the controller 16; in a semi autonomous mode the controller 16 controls one or two of vehicle propulsion, braking, and steering; in a non autonomous mode a human operator controls each of vehicle propulsion, braking, and steering.

The controller 16 may include programming to operate one or more of vehicle brakes, propulsion (e.g., control of acceleration in the vehicle 18 by controlling one or more of an internal combustion engine, electric motor, hybrid engine, etc.), steering, climate control, interior and/or exterior lights, etc., as well as to determine whether and when the controller 16, as opposed to a human operator, is to control such operations. Additionally, the controller 16 may be programmed to determine whether and when a human operator is to control such operations.

The controller 16 may include or be communicatively coupled to, e.g., via a vehicle 18 communication bus, more than one processor, e.g., controllers or the like included in the vehicle 18 for monitoring and/or controlling various vehicle 18 controllers, e.g., a powertrain controller, a brake controller, a steering controller, etc. The controller 16 is generally arranged for communications on a vehicle 18 communication network that can include a bus in the vehicle 18 such as a controller area network (CAN) or the like, and/or other wired and/or wireless mechanisms.

The controller 16 is programmed to emit a series of shots of light into the field of view FOV of the light detector 14 and to detect shots reflected from an object in the field of view FOV. For environmental mapping, the controller 16 may record only detected shots from the first subset of the series of shots emitted by the light emitter 12 to memory, e.g., to memory chip 38, in order to effectively reduce the amount of data stored and the size of memory required to store that data. The controller 16 determines the number of shots in the first subset based on the distance of the object from the light detector 14. The distance of the object from the light detector 14 is determined by the time of the return of the shot to the light detector 14. For example, the controller 16 is programmed to determine that, for relatively closer objects, the first subset of the series of shots is relatively smaller and for relatively farther objects, the first subset of the series of shots is relatively larger. Accordingly, less data is recorded for closer objects without a meaningful reduction in resolution for close objects. Since detected shots from a smaller first subset of the series of shots is recorded for closer objects, memory associated with the closer objects may be reduced. This results in an overall reduction in necessary memory, as described below. For farther objects, the first subset of the series of shots is larger to increase resolution necessary for farther objects.

Since the LiDAR system 10 determines the size of the first subset of the series of shots for which detected shots are to be recorded and this size of the first subset is based on distance of the object, and the LiDAR system 10 records only detected shots from that first subset of the series of shots, the LiDAR system 10 effectively operates to selectively compress data. For example, if the object is closer to the light detector 14, less resolution is required to adequately detect the object. For relatively closer objects, the LiDAR system 10 may operate to record a first subset that is smaller than a first subset for a relatively farther object. Accordingly, less data is recorded for closer objects without a meaningful reduction in resolution for close objects. For farther objects, the first subset is larger to increase resolution necessary for farther objects. Since a smaller first subset of the series of shots is recorded for closer objects, memory associated with the closer objects may be reduced. This results in an overall reduction in necessary memory, e.g., reduction of size of a memory chip 38, as described below.

The controller 16 is programmed to activate the light emitter 12 to emit a series of shots into a field of view FOV of the light detector 14 and to activate the light detector 14 to detect shots reflected from an object in the field of view FOV. Specifically, the controller 16 controls the timing of the emission of the shots and the activation of the light detector 14 to detect shots that are reflected in the field of view FOV. The controller 16 is programmed to repeat the activation of the light emitter 12 and the light detector 14, i.e., emitting a series of shots from the light emitter 12 and timing the activation of the light detector 14 for each shot of the series of shots emitted from the light emitter 12, as shown in block 1240.

The controller 16 is programmed to activate the light detector 14 during the full acquisition time, i.e., the time from after the light emitter 12 is emits light until the time at which a photon would be returned from the maximum distance of desired detection (i.e., the maximum of the frame). The controller 16 keeps the photodetectors 28, e.g., SPAD, operable and ready to detect light during this time. Due to the nature of SPADs, ambient light and noise may trigger the SPAD. The SPAD is quickly quenched and reset the SPAD (a deadtime in which the SPAD cannot detect a photon) for detection the next photon within the acquisition frame (i.e., multiple photons, representing different distances, can be detected by a single pixel 30 within a given acquisition frame. This, plus the number of shots emitted from the light emitter 12, increases the signal to noise ratio.

As set forth above, the controller 16 is programmed to determine the size of the first subset of the series of shots for which detected shots are to be recorded. Specifically, the controller 16 is programmed to determine the size of the first subset of the series of shots for which detected shots are to be recorded in memory, e.g., the memory chip connected to the ROIC. As set forth further below, the detected shots that are reflected from the field of view FOV and detected by the light detector 14 and are not from shots that are part of the first subset of the series of shots are disregarded, i.e., not read out by the ROIC to the memory chip. In other words, the compression of data is performed at the light detector 14, i.e., on the chip of the light detector 14.

When an object in the field of view FOV is illuminated by the series of shots, the light detector 14 detects shots returned to the light detector 14, i.e., detected shots, and compiles the histogram, as described above. The controller 16 is programmed to determine the distance of the object from the light detector 14 based on the histogram. Specifically, the light detector 14 compiles the shots detected by the light detector 14 into a histogram having bins each associated with a distance of the object from the light detector 14, as set forth above. Specifically, the light detector 14 may have a register for each bin, as described above. This histogram for the series of shots is used to identify shots returned by reflection by an object in the field of view FOV and to reduce noise, i.e., other detections by the light detector 14 not corresponding to light emitted by the light emitter 12 and returned to the light detector 14 by reflection from an object in the field of view FOV. After the histogram is complete for the series of shots, the subset of the series of shots is read from the diode to the memory by the ROIC 36.

With reference to FIGS. 9A-11, the controller 16 is programmed to determine the size of the first subset of the series of shots based on a distance of the object from the light detector 14. Specifically, for each series of shots, the controller 16 determines the size of the first subset of the series of shots read from the diode to the memory chip 38 by the ROIC based on the timing of the returned shots from an object in the field of view FOV as identified with the histogram.

Figure 11:
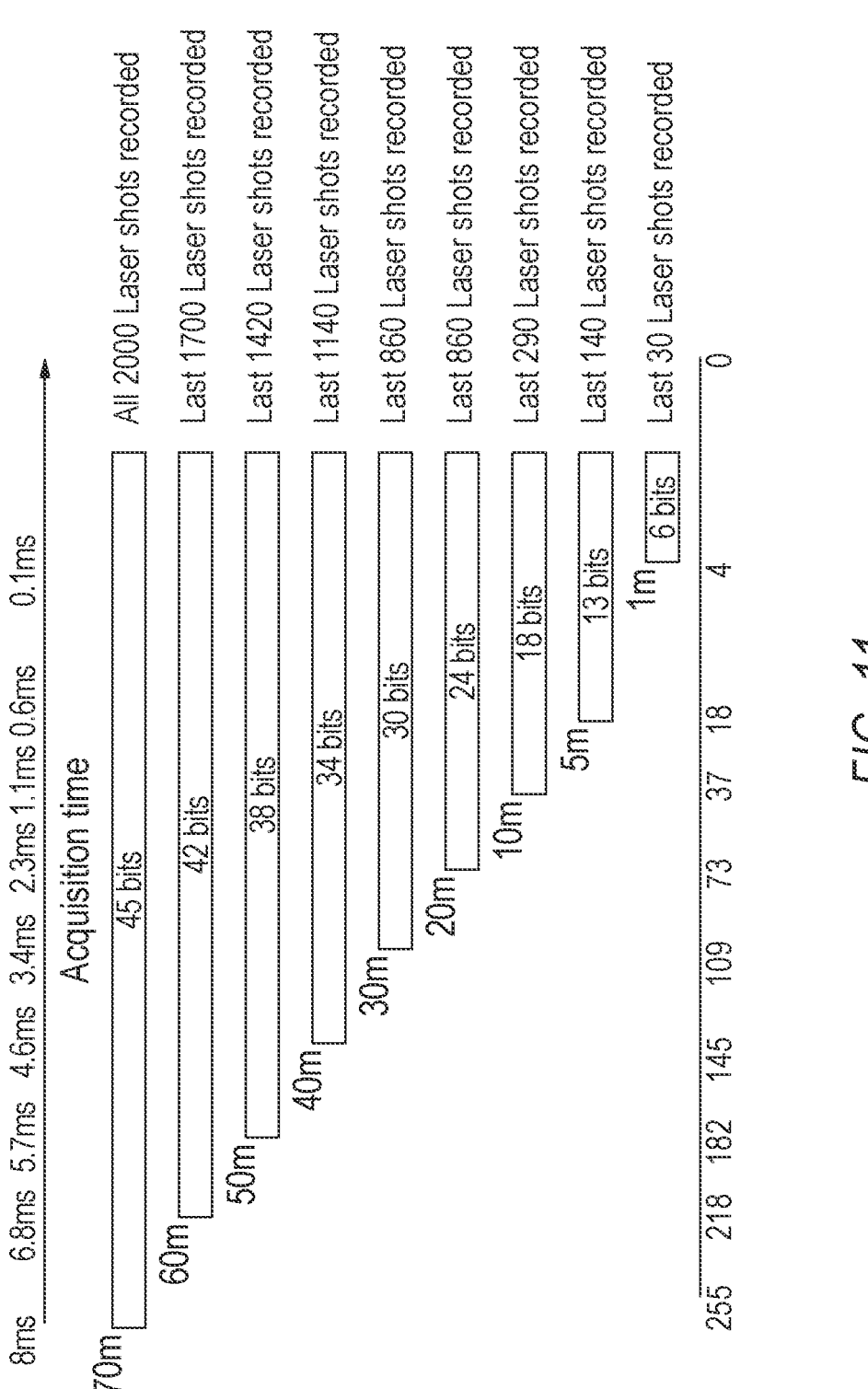
FIG. 11 is another depiction showing examples of the size of a subset of the series of shots recorded to memory for given distances of the object from the light detector.

The size of the subset of the series of shots increases with increase in distance of the object from the light detector 14. In the examples shown in FIG. 9A-B, this increase may be linear, exponential, etc. FIGS. 10 and 11 show example data points that show the number of shots at selected distances of the object from the light detector 14.

As an example, the controller 16 is programmed to, during one series of shots, determine the size of one first subset of the series of shots based on detected shots at a first distance from the light detector 14 in the field of view FOV and detected by the light detector 14, and during another series of shots, determine the size of another first subset of the series of shots based on detected shots at a second distance from the light detector 14. In an example in which the first distance is less than the second distance, the size of the first subset for the second distance is larger than the size of the first subset for the first distance. As another example, size of the first subset of the series of shots can be a predetermined size at the time of manufacturing and/or may be later updated with a firmware update.

The shots of the first subset of the series of shots are consecutive shots detected by the light detector 14. In one example, the shots of the first subset are the consecutive shots at the beginning of the entire series of shots, i.e., detected shots from a number of consecutive shots at the beginning of the entire series of shots are recorded. As another example, the first subset of the series of shots are the consecutive shots at the end of the entire series of shots, i.e., detected shots from a number of consecutive shots at the end of the entire series of shots are recorded. Accordingly, it should be appreciated that the adjectives "first" and "second" modifying "subset" are merely used as identifiers and do not indicate order or importance.

The controller 16 is programmed to record the detected shots from the first subset of the series of shots. Specifically, after the size of the first subset of the series of shots is determined based on the distance of the object from the light detector 14, shots of the first subset of the series of shots that are reflected in the field of view back to the light detector 14, i.e., detected shots from the first subset of the series of shots, are read from the diode to the memory by the ROIC 36. Specifically, the controller 16 controls the ROIC 36 to read these detected shots.

In some embodiments, the controller 16 may be programmed to disregard the shots detected by the light detector 14 that are not from shots in the first subset of the series of shots. In other words, when the detected shots of the first subset of the series of shots are read to the memory chip 38 by the ROIC 36, the detected shots not from the subset of the series of shots are not recorded to the memory chip 38 (e.g., are cleared from the light detector 14). Said differently, the detected shots not from the subset of the series of shots may be discarded. This effectively compresses the data recorded to memory and allows for the memory chip 38 to be smaller, as described above.

As another example, as shown in FIGS. 13-17, the controller may be programmed to group a second subset of the series of shots not in the first subset and to identify an object moving in the field of view FOV based on detected shots from the second subset of the series of shots. In such an example, movement of the object in the field of view FOV is detected by the ROIC 36 without reading to the memory chip 36, as described further below. This effectively compresses the data recorded to memory and allows the memory chip 38 to be smaller, as described above.

Using the detected shots from the second subset of the series of shots, the controller 16 can determine object velocity and acceleration and direction of object travel in one frame, i.e., during one series of shots emitted by the light emitter 12. At least some of the shots not in the first subset are grouped in a second subset and detected shots from the second subset are used to determine object velocity, acceleration, and direction.

As one example, the controller 16 is programmed to compile a plurality of subframes based on object distance and pixel location of detected shots from the second subset of the series of shots. Each subframe is a compilation of detected shots across all pixels 30. Specifically, each subframe is based on a detected shots from one shot or a group of shots, respectively, in the second subset of the series of shots emitted from the light emitter 12. In other words, one shot or group of consecutive shots is used to generate one subframe, another shot or group of consecutive shots is used to generate another subframe, etc. The group of shots is sized to have a sufficient number of shots to be operated as flash LiDAR. An example of a hit matrix, i.e., showing detected shots or lack thereof, for two bins in one zone is shown in FIG. 15B. subframes for two bins. In such an example, 9 subframes are taken for five pixels 30 (labeled A-E) at bin 2 (in this example, up to 0.55 m from the light detector 14) and at bin 3 (in this example, up to 0.83 m from the light detector 14).

Figures 14A, 14B:
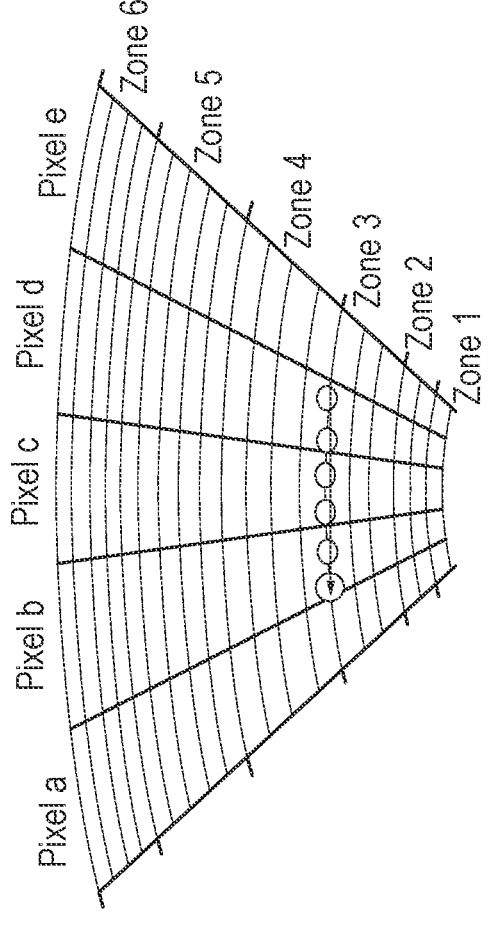
FIGS. 14A and 14B are a table and corresponding chart showing detection of object movement in the field of view.

The controller 16 is programmed to categorize object distance into zones each corresponding to a distance of an object from the light detector 14. Examples of such zones are shown in FIGS. 13-14B. As shown in FIGS. 13 and 14A, the zones closer to the light detector 14 are compilations of a greater number of subframes than zones farther from the light detector 14. In other words, more subframes are used at the zones closer to the light detector 14. This increases resolution for objects closer to the light detector 14, which can be useful in identifying quickly moving, close objects for which quick response time may be useful.

Movement of an object, including velocity, acceleration, and direction, may be identified by comparing changes in object distance (i.e., from the light detector 14) and/or pixel location (i.e., which pixel(s) 30 detects the object) between subframes. For example, the controller 16 is programmed to identify the relative velocity of an object moving in the field of view FOV by comparing changes in object distance and/or pixel location between subframes.

Figure 15A:
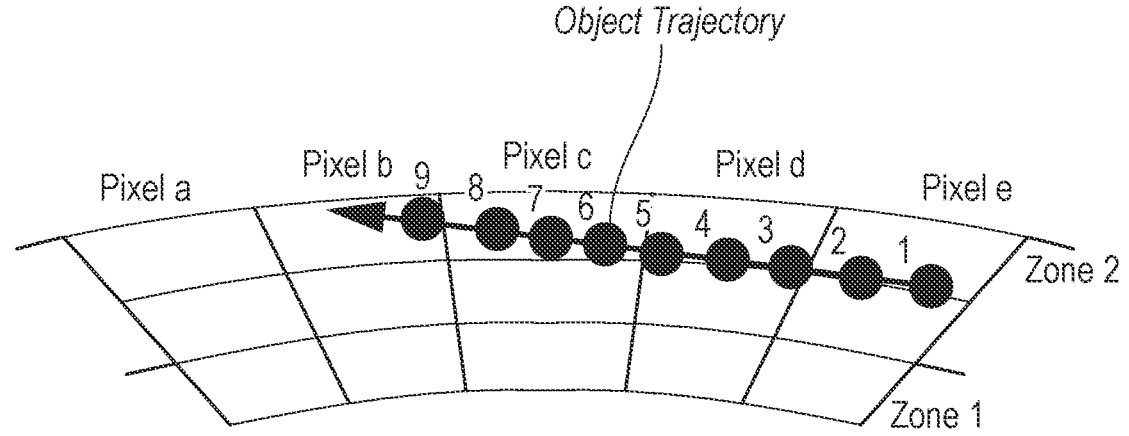

For example, with reference to FIGS. 14B and 15A, the controller is programmed to identify an object moving in the field of view by comparing changes in pixel location in adjacent pixels 30. For example, in FIG. 14B, each dot is detected object in a different subframe. Movement of the detected object across pixels 30 in different subframes indicates movement of the object in the field of view FOV. FIG. 15A shows another example of movement of a detected object across pixels 30 in different subframes. For example, FIG. 15B, which corresponds to FIG. 15A, shows the detections moving from pixel E to pixel B across 9 subframes.

As another example, the controller 16 is programmed to identify an object moving in the field of view FOV by comparing changes in object distance in adjacent subframes. For example, the controller 16 is programmed to identify an object moving in the field of view by comparing movement of a detected object across zones between subframes. An example of movement of a detected object that changes distance between subframes is shown in FIG. 15A. Specifically, FIG. 15B shows that detections are made in seven subframes across zones is shown in FIG. 15A. Specifically, FIG. 15A shows the object detected in 7 subframes in bin 2 and in 2 subframes in bin 3, showing that the object is moving farther away from the light detector 14. As another example in addition to or in the alternative to detecting movement across bins between subframes, the controller 16 may detect movement across zones.

In the example shown in the figures, the controller is programmed to identify both object movement by comparing changes in pixel location and changes in object distance across different subframes. The combination of detection of movement and timing of movement of the object across pixels 30 and at varying distances, e.g., across different bins and/or zones, may be used, in combination, to determine velocity, acceleration, and direction of movement of the object.

Figure 17:
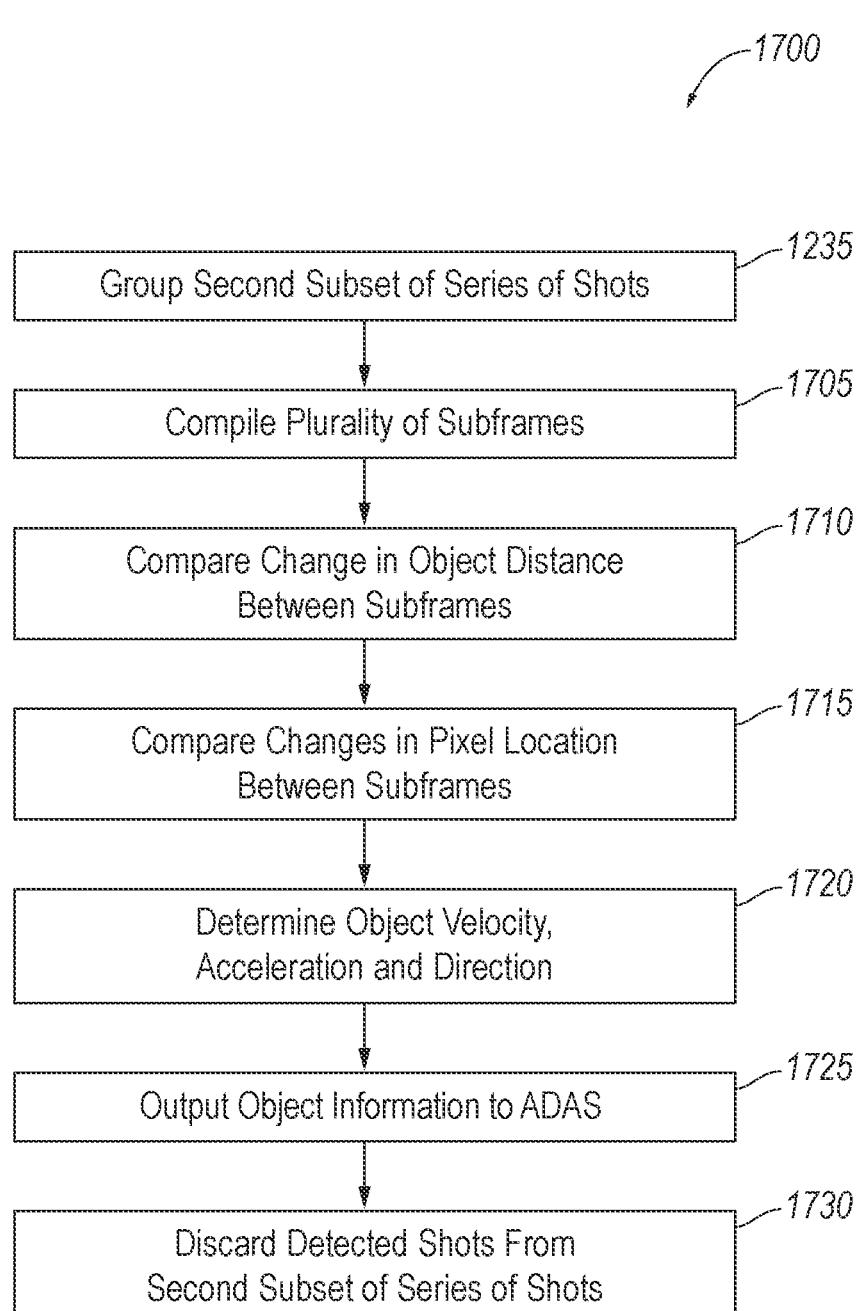
FIG. 17 is a flow chart for an example method performed by the LiDAR system.

For the detected shots of the second subset of the series of shots, the controller 16 may be programmed to detect object location based on histogram peak detection on the ROIC 36. Specifically, the controller 16 applies an algorithm to the detected shots to detect histogram peaks. The objection detection using peak detection is performed on the pixel 30 without reading out to memory, e.g., the memory chip 30. FIG. 17 shows an example of operation of a pixel 30 of the LiDAR system 10. In such an example, peak detection of the histogram (described above) is performed by the ROIC 36. The ROIC 36 also detects movement of peaks of the histogram between subframes, which is shown graphically in FIGS. 14B and 15A. Movement of these peaks are flagged as object movement and this detection of movement is communicated to the ADAS of the vehicle 18. Since the peak detection and object movement is determined on the pixel 30, the controller is programmed to disregard the detected shots of the second subset after identification of an object moving in the field of view FOV, i.e., the detected shots of the second subset are not read to the memory chip 30.

Figure 12:
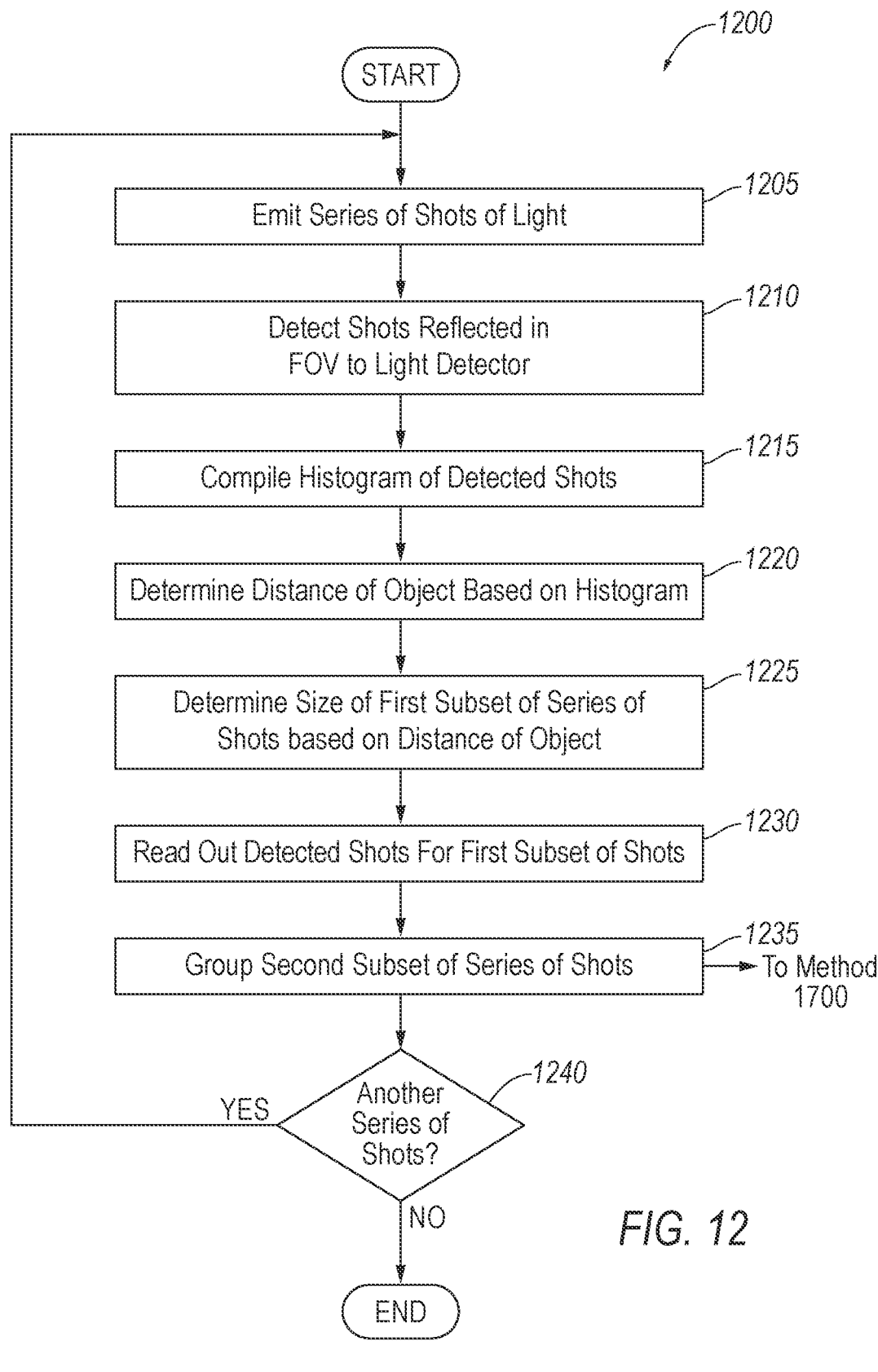
FIG. 12 is a flow chart for an example method performed by the LiDAR system.

The method 1200 for operating a LiDAR system 10 is shown in FIG. 12. The method 1200 effectively compresses data, as described above, which allows for the memory chip to be smaller. With reference to block 1205, the method includes activating the light emitter to emit a series of shots into a field of view of a light detector 14. With reference to block 1210, the method includes activating the light detector to detect shots reflected from an object in the field of view FOV. As described above, the method 1200 includes timing the application of voltage to the light emitter 12 and the light detector 14 such that the light detector 14 detects the emitted from the light emitter 12 and reflected from an object in the field of view FOV. The emission of the series of shots and corresponding control of the light detector 14 is repeated such that a plurality of series of shots are emitted. Blocks 1215-1235 are performed for each series of shots.

With reference to block 1215, the method includes compiling a histogram of the detected shots of the series that were detected by the light detector 14. For example, the histogram is compiled on the light detector 14. The light detector 14 includes a plurality of registers (e.g., multiple registers per pixel 30, each register representing a certain distance away from the LiDAR system 10), as set forth above, and the controller 16 may flip through each register in order to build up a histogram from all the registers (distances).

With reference to block 1220, the method includes determining the distance of the object from the light detector 14 based on the histogram. Specifically, the method 1200 includes reading the histogram to identify shots returned by reflection by an object in the field of view FOV, i.e., detected shots, and to reduce noise, i.e., other detections by the light detector 14 not corresponding to light emitted by the light emitter 12 and returned to the light detector 14 by reflection from an object in the field of view FOV. The controller 16 may read the histogram.

With reference to block 1225, the method includes determining the size of a subset of the series of shots for which detected shots are to be recorded based on a distance of the object from the light detector 14. Specifically, the method includes determining the size of the subset of the series of shots for which detected are to be read from the diode to the memory chip 38 by the ROIC 36 based on the timing of the returned shots from an object in the field of view as identified with the histogram. As set forth above, the size of the subset of the series of shots increases with increase in distance of the object from the light detector 14. As an example, the method includes, during one series of shots, determining the size of a first subset of the series of shots reflected by an object at a first distance from the light detector in the field of view FOV and detected by the light detector 14, and during another series of shots, determining the size of a second subset of the series of shots reflected by an object at a second distance from the light detector 14. In an example in which the first distance is less than the second distance, the second subset is larger than the first subset.

As set forth above, the shots of the subset of the series of shots are consecutive shots detected by the light detector 14. In one example, the method determines the size of the subset of the series of shots as consecutive shots at the beginning of the entire series of shots. As another example, the method determines the size of the subset of the series of shots as consecutive shots at the end of the entire series of shots that are reflected by an object in the field of view FOV and detected by the light detector 14.

With reference to block 1230, the method includes recording the detected shots from the subset of the series of shots. Specifically, the method includes instructing the ROIC 36 to read the detected shots of the subset from the diode. Specifically, the controller 16 controls the ROIC 36 for each pixel 30 to read the detected shots from the subset of the series of shots from the diode of that pixel 30 to the memory chip 38. The controller 16 selectively applies voltage to the ROIC 36 to control the ROIC 36.

With reference to block 1235, the method incudes grouping a second subset of the series of shots, after which method 1700, shown in FIG. 17, is performed. With reference to FIG. 17, the method 1700 includes grouping a second subset of the series of shots not in the first subset and identifying an object moving in the field of view FOV based on detected shots from the second subset of the series of shots.

With reference to block 1705, the method includes compiling a plurality of subframes based on object distance and pixel location of detected shots from the second subset of the series of shots. The method 1700 includes identifying an object moving in the field of view FOV by comparing changes in object distance and/or pixel location between subframes. For example, as shown in block 1710, the method 1700 includes identifying an object moving in the field of view FOV by comparing changes in object distance in adjacent subframes and, as shown in block 1710, the method 1700 includes identifying an object moving in the field of view FOV by comparing movement of a detected object across zones between subframes. Specifically, as described above, the change in object distance and the and the movement across pixels may be identified based on histogram peak detection on the ROIC 36.

Figure 16:
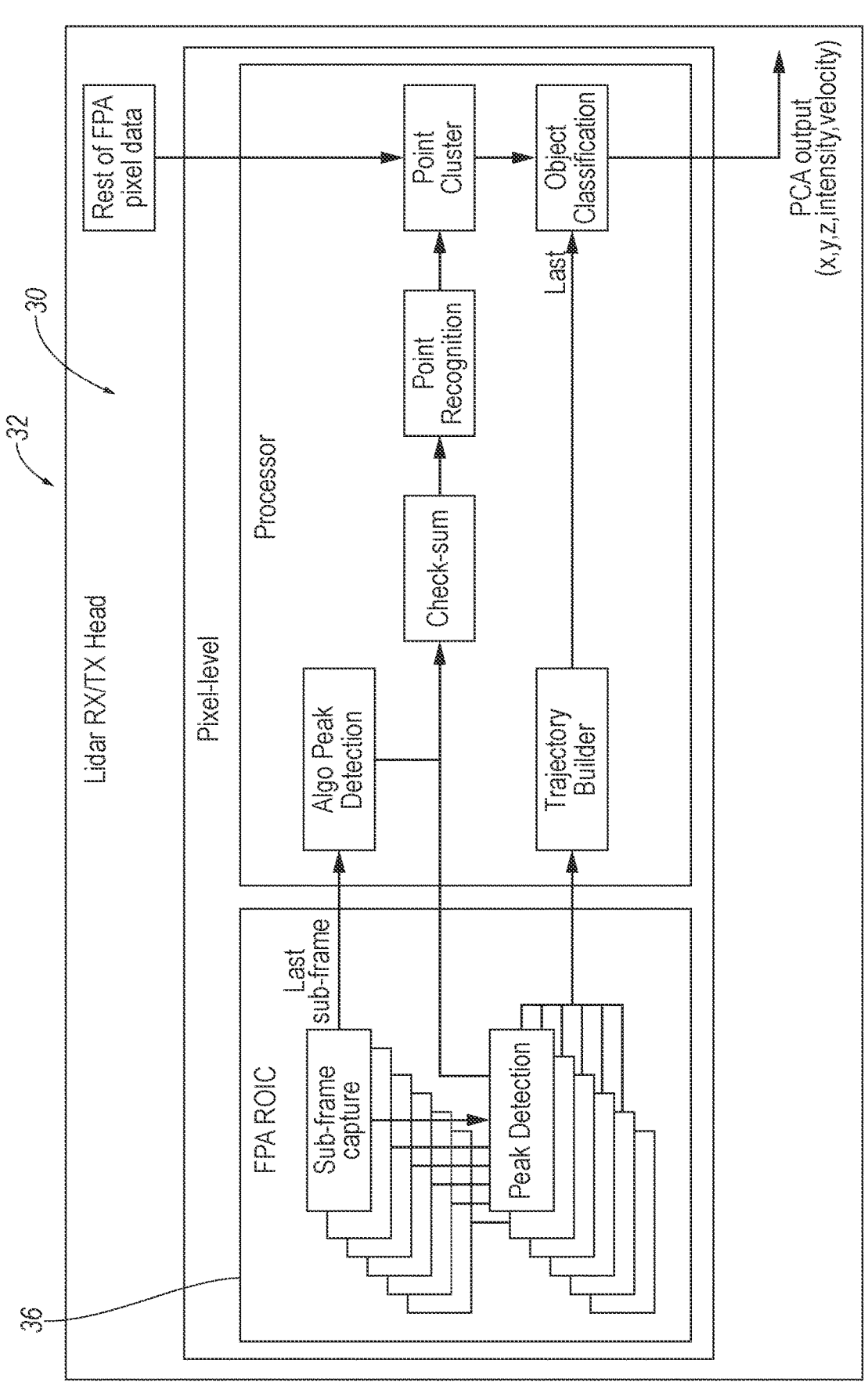
FIG. 16 is a flow chart showing an example operation of a pixel of the LiDAR system.

In block 1720, the method includes determining object velocity, acceleration, and direction. Specifically, this determination is performed on the pixel 30. The ROIC 36 uses a peak detection algorithm to detect histogram peaks that correspond to object detection. As shown in FIG. 16, the controller 16 applies a trajectory builder algorithm to determine the object velocity, acceleration, and direction. In block 1725, the method 1700 includes outputting object information to the ADAS of the vehicle 18.

With reference to block 1730, the method 1700 includes discarding detected shots from the second subset of the series of shots. In other words, as describe above, the detected shots from the second subset of the series of shots are not recorded to the memory chip 38 (e.g., are cleared from the light detector 14).

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A light detection and ranging (LiDAR) system comprising:
    a light emitter;
    a light detector;
    and a controller programmed to:
    activate the light emitter to emit a series of shots into a field of view of the light detector;
    activate the light detector to detect shots reflected from an object in the field of view;
    record only the detected shots from a first subset of the series of shots;
    wherein the first subset of the series of shots has a size that is determined by the controller and is variable, and the size of the first subset of the series of shots is determined by the controller prior to transmission of the shots from the light emitter based upon a distance to the object, wherein the object may be a first object or a second object, the first object is nearer to the light detector than the second object, and a first size of the first subset is determined to record the first object and a second size of the first subset is determined to record the second object, the first size being less than the second size, the first size providing a first resolution that is less than a second resolution provided by the second size;
    group a second subset of the series of shots not in the first subset; and based on the detected shots from the second subset of the series of shots, identify the object moving in the field of view.

2. The LiDAR system as set forth in claim 1, wherein the light detector includes a plurality of pixels and the controller is programmed to:

compile a plurality of subframes based on an object distance and a pixel location of detected shots from the second subset of the series of shots; and identify the object moving in the field of view by comparing changes in at least one of object distance or pixel location between subframes.

3. The LiDAR system as set forth in claim 2, wherein the controller is programmed to identify the object moving in the field of view by comparing changes in object distance in adjacent subframes.

4. The LiDAR system as set forth in claim 2, wherein the controller is programmed to identify the object moving in the field of view by comparing changes in pixel location in adjacent pixels.

5. The LiDAR system as set forth in claim 2, wherein the controller is programmed to identify a relative velocity of the object moving in the field of view by comparing changes in at least one of object distance or pixel location between subframes.

6. The LiDAR system as set forth in claim 2, wherein the controller is programmed to:

categorize object distance into zones each corresponding to a distance of the object from the light detector; and identify an object moving in the field of view by comparing movement of a detected object across zones between subframes.

7. The LiDAR system as set forth in claim 6, wherein zones closer to the light detector are compilations of a greater number of subframes than zones farther from the light detector.

8. The LiDAR system as set forth in claim 2, wherein the controller is programmed to compile each subframe based on a group of shots, respectively, of the series of shots emitted from the light emitter.

9. The LiDAR system as set forth in claim 8, wherein the controller is programmed to detect an object location based on histogram peak detection on a read-out integrated circuit.

10. The LiDAR system as set forth in claim 1, wherein size of the first subset of the series of shots increases with increase in distance of the object from the light detector.

11. The LiDAR system as set forth in claim 1, wherein controller is programmed to discard the detected shots of the second subset after identification of the object moving in the field of view.

12. The LiDAR system as set forth in claim 1, wherein light detector includes an array of single-photon avalanche detectors.

13. A method operating a light detection and ranging (LiDAR) system, the method comprising:

activating a light emitter to emit a series of shots into a field of view of a light detector;

activating the light detector to detect shots reflected from an object in the field of view;

recording only detected shots from a first subset of the series of shots;

wherein the first subset of the series of shots has a size that is variable and the size of the first subset of the series of shots is determined by a controller prior to transmission from the light emitter based upon a distance to the object, wherein the object may be a first object or a second object, the first object is nearer to the light detector than the second object, and a first size of the first subset is determined to record the first object and a second size of the first subset is determined to record the second object, the first size being less than the second size, the first size providing a first resolution that is less than a second resolution provided by the second size;

grouping a second subset of the series of shots not in the first subset; and identifying the object moving in the field of view based on detected shots from the second subset of the series of shots.

14. The method as set forth in claim 13, further comprising:

compiling a plurality of subframes based on an object distance and pixel location of detected shots from the second subset of the series of shots; and identifying the object moving in the field of view by comparing changes in at least one of object distance or pixel location between subframes.

15. The method as set forth in claim 14, further comprising identifying the object moving in the field of view by comparing changes in object distance in adjacent subframes.

16. The method as set forth in claim 14, further comprising identifying the object moving in the field of view by comparing changes in pixel location in adjacent pixels.

17. The method as set forth in claim 14, further comprising identifying a relative velocity of the object moving in the field of view by comparing changes in at least one of object distance or pixel location between subframes.

18. The method as set forth in claim 14, further comprising:

categorizing object distance into zones each corresponding to a distance of the object from the light detector; and identifying an object moving in the field of view by comparing movement of a detected object across zones between subframes.

19. The method as set forth in claim 18, wherein zones closer to the light detector are compilations of a greater number of subframes than zones farther from the light detector.

20. The method as set forth in claim 14, further comprising compiling each subframe based on a group of shots, respectively of the series of shots emitted from the light emitter.

21. The method as set forth in claim 20, further comprising detecting an object location based on histogram peak detection on a read-out integrated circuit.

22. The method as set forth in claim 13, wherein the size of the first subset of shots for which detected shots are to be recorded increases with increase in distance of the object from the light detector.

23. The method as set forth in claim 13, further comprising discarding the detected shots from the second subset of the series of shots after identification of the object moving in the field of view.

* * * * *